(12) United States Patent
Deguchi et al.

(10) Patent No.: US 12,282,699 B2
(45) Date of Patent: Apr. 22, 2025

(54) VEHICLE DISPLAY DEVICE, VEHICLE DISPLAY METHOD, AND RECORDING MEDIUM

(71) Applicant: Panasonic Intellectual Property Management Co., Ltd., Osaka (JP)

(72) Inventors: Yukinari Deguchi, Hyogo (JP); Atsuya Nasu, Hyogo (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 0 days.

(21) Appl. No.: 18/371,130

(22) Filed: Sep. 21, 2023

(65) Prior Publication Data

US 2024/0111472 A1 Apr. 4, 2024

(30) Foreign Application Priority Data

Sep. 30, 2022 (JP) ................................. 2022-157717

(51) Int. Cl.
| | | |
|---|---|---|
| *G06F 3/14* | (2006.01) | |
| *B60K 35/00* | (2006.01) | |
| *G06F 3/147* | (2006.01) | |
| *B60K 35/29* | (2024.01) | |

(52) U.S. Cl.
CPC ............ *G06F 3/1446* (2013.01); *B60K 35/00* (2013.01); *G06F 3/147* (2013.01); *B60K 35/29* (2024.01); *B60K 2360/182* (2024.01)

(58) Field of Classification Search
CPC ......... G06F 3/1423–1446; G06F 3/147; B60K 35/29; B60K 2360/182
See application file for complete search history.

(56) References Cited

U.S. PATENT DOCUMENTS

2020/0057589 A1\* 2/2020 Jo ............................ G06F 3/14

FOREIGN PATENT DOCUMENTS

| JP | 2004-295038 A | 10/2004 |
|---|---|---|
| JP | 2020-140133 A | 9/2020 |

OTHER PUBLICATIONS

Notice of Reasons for Refusal dated Dec. 3, 2024 issued for the corresponding Japanese patent application No. 2022-157717, together with an English translation.
Notice of Reasons for Refusal dated Sep. 10, 2024 issued for the corresponding Japanese patent application No. 2022-157717, together with an English translation.

\* cited by examiner

*Primary Examiner* — Gene W Lee
(74) *Attorney, Agent, or Firm* — GREENBLUM & BERNSTEIN, P.L.C.

(57) ABSTRACT

A vehicle display device transfers image information to a transfer destination that is a display device included in a vehicle, and includes: a transfer mode determiner that determines a transfer mode of the image information suitable for a rendering capability of the transfer destination, based on the image information, a rendering capability of a transfer source that is the vehicle display device, and the rendering capability of the transfer destination; and a transfer processor that converts a preset transfer mode to the transfer mode determined by the transfer mode determiner, and transfers the image information to the transfer destination in the transfer mode as converted.

13 Claims, 14 Drawing Sheets

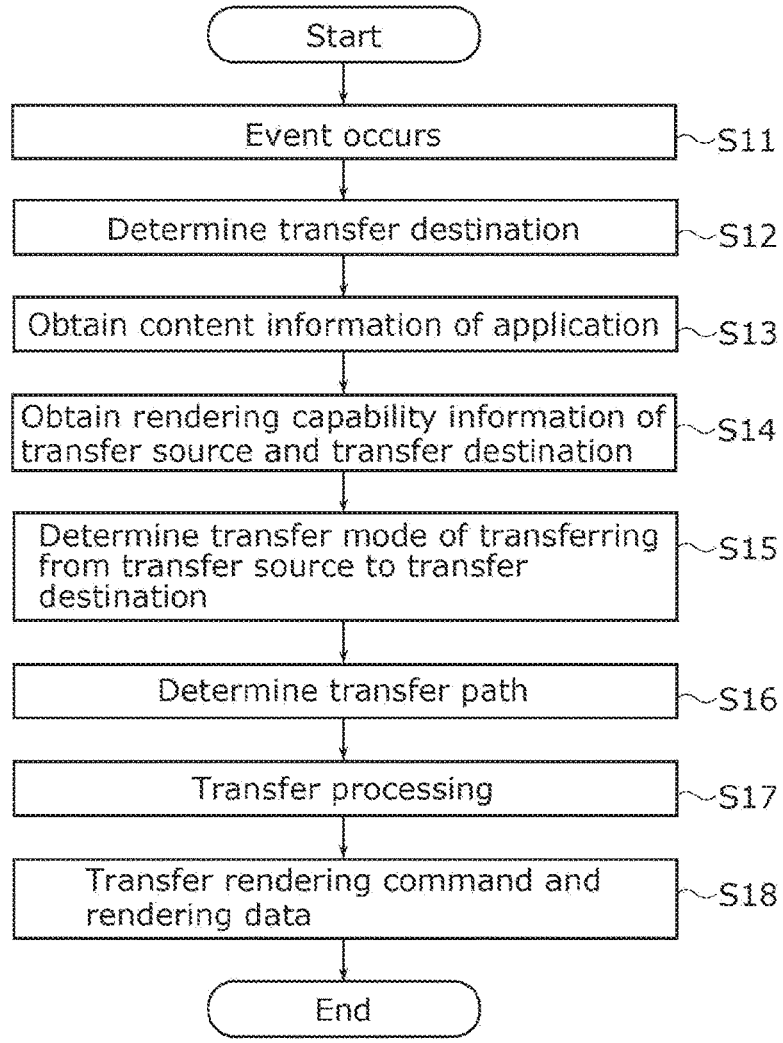
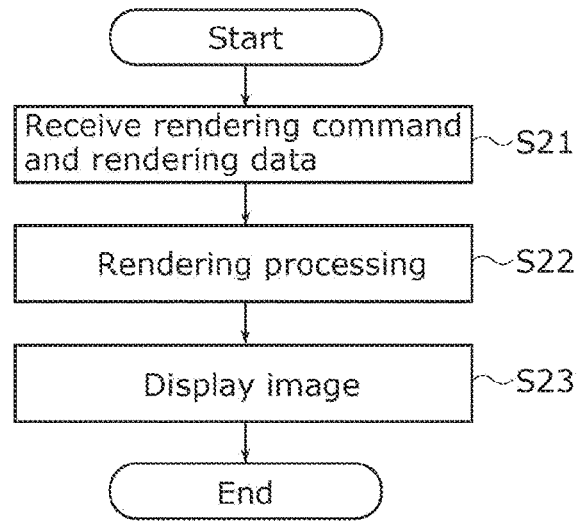

VEHICLE DISPLAY DEVICE, VEHICLE DISPLAY METHOD, AND RECORDING MEDIUM

CROSS REFERENCE TO RELATED APPLICATION

The present application is based on and claims priority of Japanese Patent Application No. 2022-157717 filed on Sep. 30, 2022.

FIELD

The present disclosure relates to a vehicle display device, a vehicle display method, and a recording medium.

BACKGROUND

Recent years have seen a rise in demand for a display control system that includes a plurality of display devices to achieve simultaneous rendering on any combination of the plurality of display devices. For example, Patent Literature (PTL) 1 discloses a display control system that includes a first controller and a second controller that control displaying of information images on a plurality of display devices. For the transfer of an information image to the second controller, the first controller switches the transfer mode between a first transfer mode and a second transfer mode. The first transfer mode requires a transfer source to perform rendering processing, and the second transfer mode requires a transfer destination to perform the rendering processing. This allows the display control system to reduce delays occurring during the transfer of the information image.

CITATION LIST

Patent Literature

PTL 1: Japanese Unexamined Patent Application Publication No. 2020-140133

SUMMARY

Technical Problem

However, the method according to PTL 1 can be improved upon.

In view of this, a vehicle display device according to one aspect of the present disclosure is capable of improving upon the above related art.

Solution to Problem

In accordance with an aspect of the present disclosure, a vehicle display device that transfers image information to a transfer destination that is a display device included in a vehicle includes: a transfer mode determiner that determines a transfer mode of the image information suitable for a rendering capability of the transfer destination, based on the image information, a rendering capability of a transfer source that is the vehicle display device, and the rendering capability of the transfer destination; and a transfer processor that converts a preset transfer mode to the transfer mode determined by the transfer mode determiner, and transfers the image information to the transfer destination in the transfer mode as converted.

In accordance with another aspect of the present disclosure, a vehicle display method of transferring image information from a transfer source to a transfer destination that is a display device included in a vehicle includes: determining a transfer mode of the image information suitable for a rendering capability of the transfer destination, based on the image information, a rendering capability of the transfer source, and the rendering capability of the transfer destination; and converting a preset transfer mode to the transfer mode determined in the determining, and transferring the image information to the transfer destination in the transfer mode as converted in the converting.

In accordance with still another aspect of the present disclosure, a non-transitory computer-readable recording medium has recorded thereon a computer program for causing a computer to execute the vehicle display method.

Advantageous Effects

A vehicle display device according to the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 3 is a flowchart of a processing operation performed by a transfer source according to Embodiment.

FIG. 4 is a flowchart of a processing operation performed by a transfer destination according to Embodiment.

DESCRIPTION OF EMBODIMENT

The following embodiments are general or specific examples of the present disclosure. The numerical values, shapes, materials, elements, arrangement and connection configuration of the elements, steps, the order of the steps, etc., described in the following embodiments are merely examples, and are not intended to limit the present disclosure. Among elements in the following embodiments, those not described in any one of the independent claims indicating the broadest concept of the present disclosure are described as optional elements.

Note that the respective figures are schematic diagrams and are not necessarily precise illustrations. Additionally, components that are essentially the same share the same reference signs in the figures.

Hereinafter, certain exemplary embodiments will be described in detail with reference to the accompanying Drawings.

Embodiment

<Functional Configuration>

Display system 1 according to the present embodiment is described with reference to FIG. 1 and FIG. 2.

Figure 1:
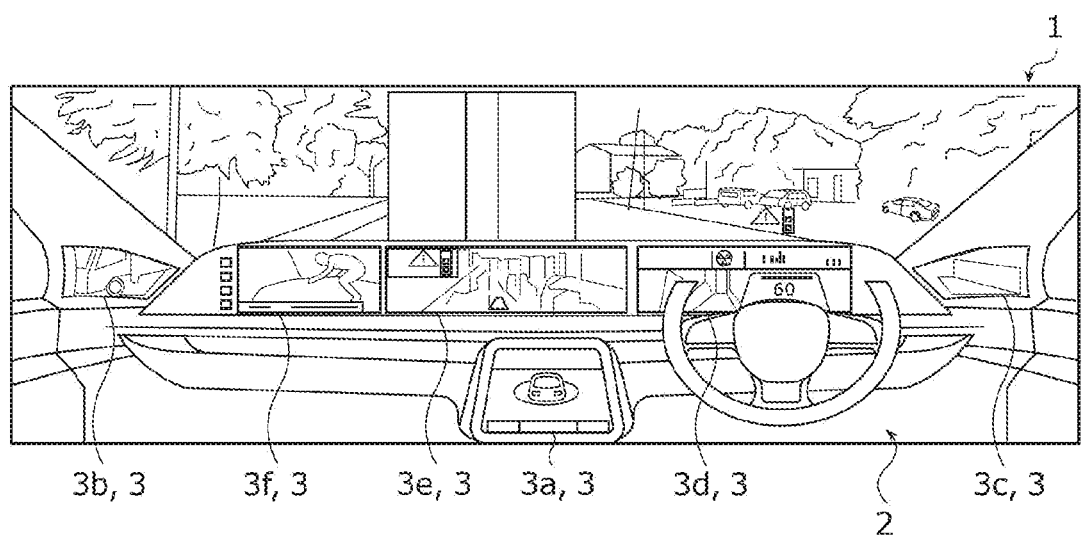
FIG. 1 is a schematic diagram of a display system included in a vehicle, according to Embodiment.

FIG. 1 is a schematic diagram of display system 1 included in vehicle 2, according to Embodiment. FIG. 2 is a block diagram of display system 1 according to Embodiment.

As illustrated in FIG. 1, display system 1 displays a plurality of images on each display screen of at least one display device.

Display system 1 can display the plurality of images on each display screen of the at least one display device, automatically or through manual operation by an occupant.

Display system 1 is included in, for example, vehicle 2 that includes the at least one display device. On this account, the image displayed by the at least one display device according to the present embodiment is based on an application. Examples of information indicated by the image include: operating statuses of vehicle instruments and in-vehicle devices; navigation information; a captured image; and surrounding vehicle information. The vehicle instruments include a speed meter, a direction indicator light, a warning light, an odometer, a shift position indicator, a fuel gauge, and a water temperature gauge. The in-vehicle devices include a sound device, an in-vehicle lighting device, and a seating device. The navigation information is used by a user, when traveling in vehicle 2, to find the current location and receive routing assistance to reach a destination, for example. The captured image is an image of the surrounding or inside of vehicle 2, captured by an imaging device included in vehicle 2. The surrounding vehicle information indicates the presence or absence of a surrounding vehicle near vehicle 2, the number of surrounding vehicles, the speed of the surrounding vehicle, and a distance between vehicle 2 and the surrounding vehicle, for example.

Examples of the display device include a personal computer (PC) including a liquid crystal display, a mobile terminal such as a smartphone, and indicators such as an automotive navigation system, an electron mirror system, and a multi-information display that are included in vehicle 2. As illustrated by example in FIG. 1, a plurality of display devices 3 include: automotive navigation system 3a located in the midsection in the vehicle width direction; an electron mirror system functioning as left-side mirror 3b and right-side mirror 3c; and a plurality of multi-information displays 3d, 3e, and 3f. These display devices 3 are arranged side by side in order for an occupant of vehicle 2 to see them all at once.

Display system 1 includes transfer source 20 and transfer destinations 30. As illustrated by example in FIG. 2, display system 1 includes first transfer destination 40 and second transfer destination 50 as transfer destinations 30. In the present embodiment, first transfer destination 40 and second transfer destination 50 may be collectively referred to as transfer destinations 30. Note that although first transfer destination 40 and second transfer destination 50 are included as transfer destinations 30 by example in the present embodiment, this is not intended to be limiting. The number of transfer destinations 30 may be one or at least three.

[Transfer Source 20]

Transfer source 20 is a vehicle display device that transfers rendering data to transfer destinations 30 that are display devices included in vehicle 2. Transfer source 20 may also be a display device included in vehicle 2. The rendering data is transferred from transfer source 20 to transfer destinations 30, and includes textures and frames. The rendering data is included in image information.

A specific functional configuration of transfer source 20 is described.

Transfer source 20 includes distributed-display information obtainer 21, rendering capability information obtainer 22, application analyzer 23, application 24, transfer mode determiner 25, transfer path determiner 26, and transfer processor 27.

Distributed-display information obtainer 21 obtains distributed-display information from the plurality of transfer destinations 30. For example, when the rendering data is to be transferred from transfer source 20 to the plurality of transfer destinations 30, the distributed-display information indicates whether the plurality of transfer destinations 30 simultaneously perform remote rendering, or more specifically, whether the rendering data is displayed synchronously by the plurality of transfer destinations 30. The distributed-display information obtained by distributed-display information obtainer 21 allows transfer source 20 to cause the plurality of transfer destinations 30 to synchronously display the rendering data. Distributed-display information obtainer 21 outputs the obtained distributed-display information to transfer mode determiner 25.

Rendering capability information obtainer 22 obtains rendering capability information that indicates: a rendering capability of transfer source 20 that includes rendering capability information obtainer 22 itself; and rendering capabilities of transfer destinations 30. Here, the rendering capability information refers to hardware information on transfer source 20 and transfer destinations 30. The hardware information indicates the presence or absence of a central processing unit (CPU), the presence or absence of a graphics processing unit (GPU), the presence or absence of a decoder, the presence or absence of an encoder, a display resolution, and a name of the display device.

For example, rendering capability information obtainer 22 obtains the respective pieces of rendering capability information on transfer source 20 and transfer destinations 30, from a storage (not shown) that stores a rendering capability information table indicating their rendering capabilities. Note that rendering capability information obtainer 22 may obtain the rendering capability information table through communications with the display devices and the in-vehicle devices included in vehicle 2. The rendering capability information table associates the rendering capability information with configuration information on a virtual machine, for example. The storage may be included in the vehicle display device or a different in-vehicle device. As an example, FIG. 2 illustrates first transfer destination 40 and second transfer destination 50 as the plurality of transfer destinations 30 included in vehicle 2. As illustrated in FIG. 2, rendering capability information obtainer 22 according to the present embodiment obtains the rendering capability information indicating the rendering capability of transfer source 20, the rendering capability information indicating the rendering capability of first transfer destination 40, and the rendering capability information indicating the rendering capability of second transfer destination 50.

Rendering capability information obtainer 22 outputs the obtained respective pieces of rendering capability information indicating the rendering capabilities of transfer source 20 and transfer destinations 30, to transfer mode determiner 25 and transfer path determiner 26.

Application analyzer 23 analyzes application 24 that causes transfer destinations 30, which are the display devices, to display the rendering data. Application analyzer 23 transfers content information as a result of the analysis performed on application 24, to transfer mode determiner 25. The content information is included in the image information.

For example, application 24 includes the content information about: the vehicle instruments (part images) for indications of a vehicle speed and an engine speed; the operating statuses of the in-vehicle devices, such as ON/OFF of an air conditioner and the volume of the sound device; the navigation information, such as a route map; and a level of danger related to driving of vehicle 2.

Transfer mode determiner 25 obtains: the distributed-display information from distributed-display information obtainer 21; the rendering capability information indicating the rendering capabilities of transfer source 20 and transfer destinations 30 from rendering capability information obtainer 22; and the content information from application analyzer 23.

If transfer source 20 is able to transfer the image information directly to transfer destination 30, transfer mode determiner 25 determines a transfer mode suitable for the rendering capability of transfer destination 30, based on the content information, the rendering capability of transfer source 20 that is the vehicle display device, and the rendering capability of transfer destination 30. As illustrated in FIG. 2, transfer mode determiner 25 according to the present embodiment determines both the transfer mode from transfer source 20 to first transfer destination 40 and the transfer mode from transfer source 20 to second transfer destination 50.

For example, assume that first transfer destination 40 includes the GPU but no decoder, and that second transfer destination 50 includes a decoder but no GPU. In this case, transfer processor 27 switches the transfer mode of first transfer destination 40 from a preset mode to a command transfer mode, and switches the transfer mode of second transfer destination 50 from a preset mode to a stream transfer mode.

Transfer mode determiner 25 outputs the distributed-display information, the determined transfer modes, and the content information to transfer path determiner 26.

Transfer path determiner 26 obtains the distributed-display information, the determined transfer modes, and the content information from transfer mode determiner 25. Furthermore, transfer path determiner 26 obtains the rendering capability information indicating the rendering capabilities of transfer source 20 and transfer destinations 30, from rendering capability information obtainer 22.

Transfer path determiner 26 determines the transfer path from transfer source 20 to transfer destination 30. Transfer path determiner 26 may determine the transfer path from transfer source 20 to transfer destination 30, based on the determined transfer mode and the rendering capability information. As illustrated in FIG. 2, transfer path determiner 26 according to the present embodiment determines the transfer path from transfer source 20 to first transfer destination 40 and the transfer path from transfer source 20 to second transfer destination 50. Transfer path determiner 26 outputs the distributed-display information, the determined transfer paths, and the transfer modes determined by transfer mode determiner 25, to transfer processor 27.

Transfer processor 27 obtains the distributed-display information, the determined transfer paths, and the determined transfer modes, from transfer path determiner 26.

Transfer processor 27 converts (or switches) the preset transfer modes to the determined transfer modes. If the rendering capabilities of first transfer destination 40 and second transfer destination 50 differ from each other, the transfer modes for first transfer destination 40 and second transfer destination 50 may differ from each other. On this account, transfer processor 27 makes the respective suitable conversions of the transfer modes for first transfer destination 40 and second transfer destination 50. As illustrated in FIG. 2, transfer processor 27 according to the present embodiment converts the preset transfer mode of first transfer destination 40 to the transfer mode determined by transfer path determiner 26 to allow the transfer from transfer source 20 to first transfer destination 40. Similarly, transfer processor 27 according to the present embodiment converts the preset transfer mode of second transfer destination 50 to the transfer mode determined by transfer path determiner 26 to allow the transfer from transfer source 20 to second transfer destination 50.

For example, assume that first transfer destination 40 includes the GPU but no decoder, and that second transfer destination 50 includes the decoder but no GPU. In this case, transfer processor 27 converts the transfer mode of first transfer destination 40 from the preset mode to the command transfer mode, and converts the transfer mode of second transfer destination 50 from the preset mode to the stream transfer mode.

Based on the distributed-display information and the content information obtained from transfer mode determiner 25, transfer processor 27 generates: a rendering command for the rendering processing on the content information; and the rendering data including the textures and frames of the content information. Here, the image is a still image or a moving image. The rendering command may be included in the image information.

Transfer processor 27 transfers the rendering command and the rendering data to transfer destinations 30 in the transfer modes as converted. As illustrated in FIG. 2, transfer processor 27 according to the present embodiment transfers the rendering command and the rendering data to first transfer destination 40 in the transfer mode determined by transfer path determiner 26 to allow the transfer from transfer source 20 to first transfer destination 40. Similarly, transfer processor 27 according to the present embodiment transfers the rendering command and the rendering data to second transfer destination 50 in the transfer mode determined by transfer path determiner 26 to allow the transfer from transfer source 20 to second transfer destination 50.

[First Transfer Destination 40 and Second Transfer Destination 50]

Each of first transfer destination 40 and second transfer destination 50 is one of the display devices included in vehicle 2. For example, each of first transfer destination 40 and second transfer destination 50 is: a PC including a liquid crystal display; a mobile terminal, such as a smartphone; or an automotive navigation system, an electron mirror system, or a multi-information display included in vehicle 2. First transfer destination 40 and second transfer destination 50 may have the same configuration or different configurations.

First transfer destination 40 includes rendering data receiver 41, rendering processor 42, and display 43. Second transfer destination 50 includes rendering data receiver 51, rendering processor 52, and display 53.

Rendering data receivers 41 and 51 each receive the rendering command and rendering data transferred from transfer source 20. Rendering data receiver 41 and rendering data receiver 51 output the received rendering command and rendering data to rendering processor 42 and rendering processor 52, respectively.

Rendering processors 42 and 52 each perform the rendering processing to adjust a display style of the rendering data, based on the rendering command. Rendering processor 42 and rendering processor 52 output images (rendering contents) obtained through the rendering processing performed on the rendering data, to display 43 and display 53, respectively.

Display 43 and display 53 are display screens that display the images obtained from rendering processor 42 and rendering processor 52, respectively. Displays 43 and 53 display the obtained images synchronously to make the displayed images consistent with each other.

Each of displays 43 and 53 is a display panel, such as a liquid crystal panel or an organic electroluminescent panel (organic EL). Displays 43 and 53 each display a map for the navigation system, menu images of the in-vehicle devices, or a graphical user interface (GUI) used for operation on an image for search.

<Processing Operation>

The processing operation of the vehicle display device, the vehicle display method, and the computer program according to the present embodiment is described with reference to FIG. 2 and FIG. 3.

FIG. 3 is a flowchart of a processing operation performed by transfer source 20 according to Embodiment.

Occasionally, an image displayed by the display device is to be displayed by different display devices. Thus, an event occurs when the rendering data of transfer source 20 is transferred to first transfer destination 40 and second transfer destination 50 that are the different display devices (S11). More specifically, transfer source 20 obtains an event for displaying the image on each of first transfer destination 40 and second transfer destination 50.

As a result of the occurrence of the event in Step S11, transfer destinations 30, or more specifically, first transfer destination 40 and second transfer destination 50 are determined (S12).

Next, transfer mode determiner 25 obtains the content information on application 24 from application analyzer 23 (S13).

Next, transfer mode determiner 25 obtains the rendering capability information indicating the rendering capabilities of transfer source 20 and transfer destinations 30 from rendering capability information obtainer 22 (S14). To be more specific, rendering capability information obtainer 22 obtains the rendering capability information indicating the rendering capability of transfer source 20, the rendering capability information indicating the rendering capability of first transfer destination 40, the rendering capability information indicating the rendering capability of second transfer destination 50.

Next, if transfer source 20 is able to transfer the image information directly to transfer destination 30, transfer mode determiner 25 determines the transfer mode of the rendering data suitable for the rendering capability of transfer destination 30, based on the content information, the rendering capability of transfer source 20 that is the vehicle display device, and the rendering capability of transfer destination 30 (S15). To be more specific, transfer mode determiner 25 determines both the transfer mode from transfer source 20 to first transfer destination 40 and the transfer mode from transfer source 20 to second transfer destination 50.

Next, after the determination of the transfer modes by transfer mode determiner 25, transfer path determiner 26 determines the transfer path from transfer source 20 to transfer destination 30 (S16). To be more specific, transfer path determiner 26 determines both the transfer path from transfer source 20 to first transfer destination 40 and the transfer path from transfer source 20 to second transfer destination 50.

Next, transfer processor 27 executes transfer processing (S17).

More specifically, after the determination of the transfer modes by transfer mode determiner 25, transfer processor 27 converts the preset transfer modes to the determined transfer modes. To be more specific, transfer processor 27 converts the preset transfer mode of first transfer destination 40 to the transfer mode determined by transfer path determiner 26 to allow the transfer from transfer source 20 to first transfer destination 40. Similarly, transfer processor 27 converts the preset transfer mode of second transfer destination 50 to the transfer mode determined by transfer path determiner 26 to allow the transfer from transfer source 20 to second transfer destination 50.

Furthermore, transfer processor 27 obtains the content information from transfer mode determiner 25, and generates: the rendering command for the rendering processing on the content information; and the rendering data including the textures and frames of the content information.

Next, transfer processor 27 transfers the rendering command and the rendering data including the textures and frames to transfer destination 30 in the transfer mode as converted (S18). To be more specific, transfer processor 27 transfers the rendering command and the rendering data to first transfer destination 40 in the transfer mode determined by transfer path determiner 26 to allow the transfer from transfer source 20 to first transfer destination 40. Similarly, transfer processor 27 transfers the rendering command and the rendering data to second transfer destination 50 in the transfer mode determined by transfer path determiner 26 to allow the transfer from transfer source 20 to second transfer destination 50. Note that the rendering command and the rendering data transferred to first transfer destination 40 are different from those transferred to second transfer destination 50. However, the rendering command and the rendering data transferred to first transfer destination 40 may be the same as those transferred to second transfer destination 50.

Then, transfer source 20 ends the processing operation according to the flowchart of FIG. 3. Transfer destination 30 starts the processing operation according to the flowchart of FIG. 4.

FIG. 4 is a flowchart of the processing operation performed by transfer destination 30 according to Embodiment.

Figure 2:
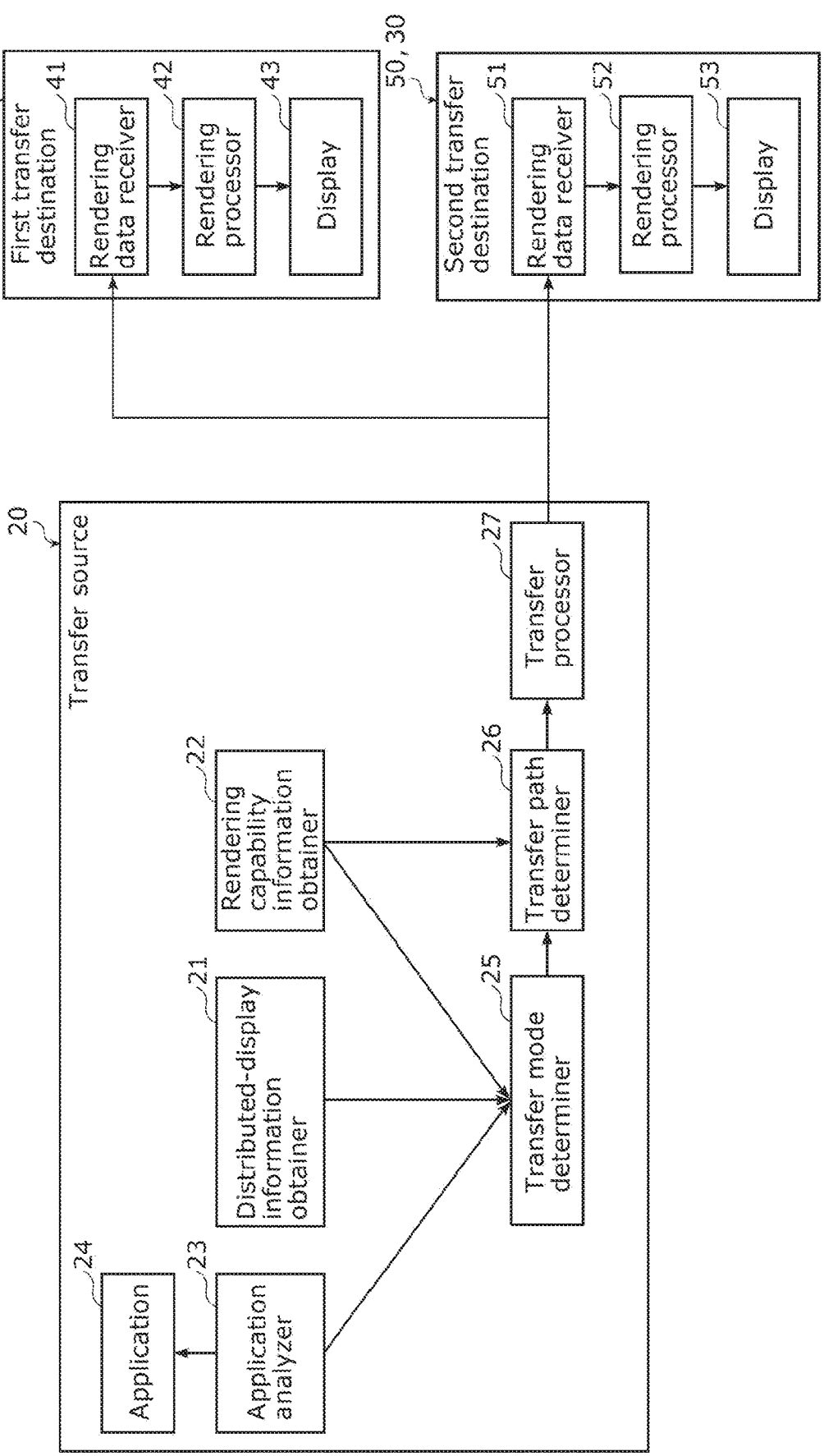
FIG. 2 is a block diagram of the display system according to Embodiment.

As illustrated in FIG. 2 and FIG. 4, rendering data receivers 41 and 51 each receive the rendering command and rendering data transferred from transfer source 20 (S21). Rendering data receiver 41 and rendering data receiver 51 output the received rendering command and rendering data to rendering processor 42 and rendering processor 52, respectively.

Next, rendering processors 42 and 52 each perform the rendering processing to adjust the display style of the rendering data, based on the rendering command (S22). Rendering processor 42 and rendering processor 52 output the images obtained through the rendering processing performed on the rendering data, to display 43 and display 53, respectively.

Next, displays 43 and 53 each display the obtained images (S23). Display system 1 in the present example includes the plurality of display devices keeping their clocks synchronized. This allows display 43 and display 53 to synchronously display the rendering commands and rendering data transferred from transfer source 20 to first transfer destination 40 and second transfer destination 50.

Then, first transfer destination 40 and second transfer destination 50 end the processing operation according to the flowchart.

Figure 5:
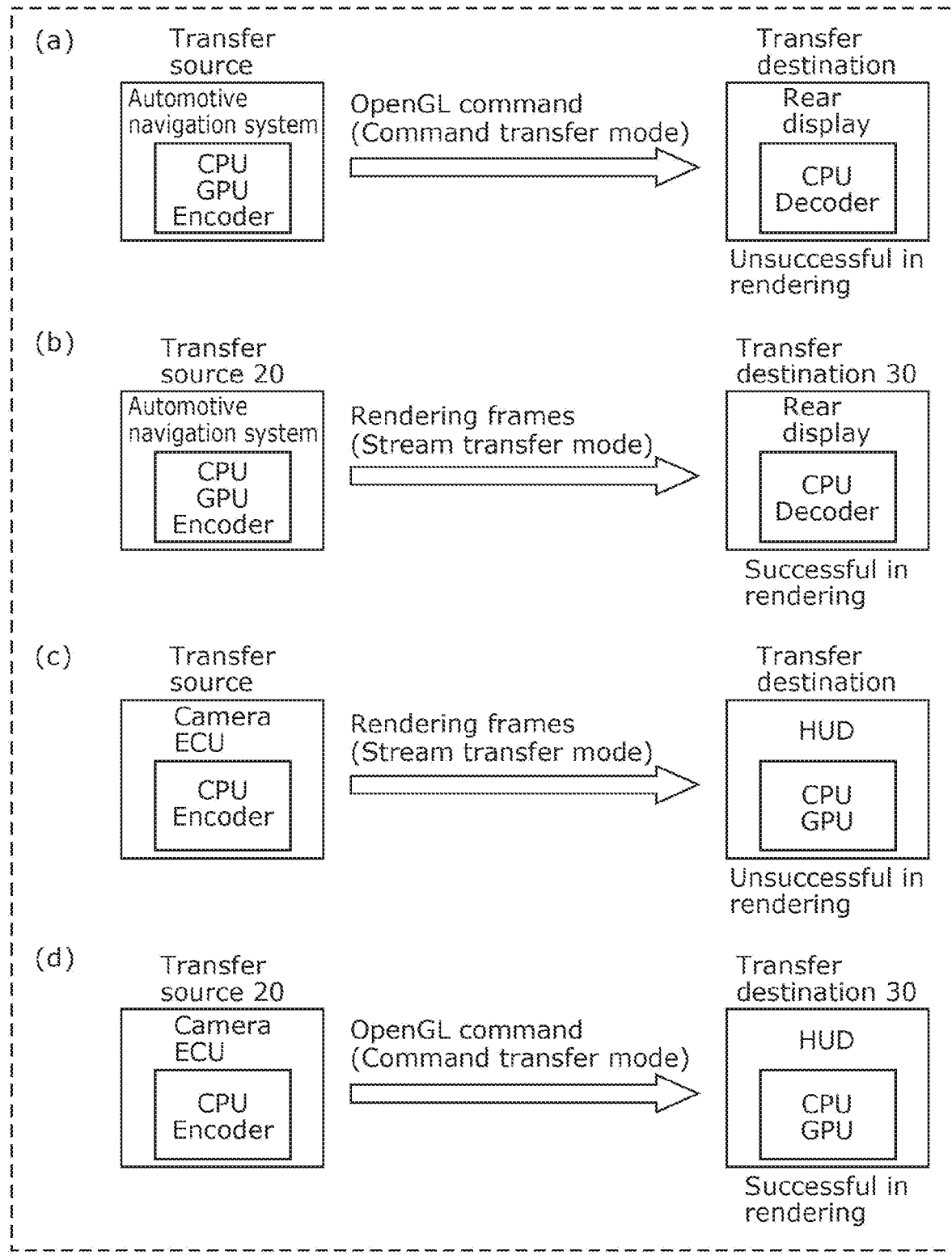
FIG. 5 is a diagram illustrating examples of rendering performed successfully and unsuccessfully using rendering data transferred from the transfer source to the transfer destinations.

The following describes in detail the operation performed by the vehicle display device, the vehicle display method, and the computer program when vehicle 2 is actually driven, with reference to FIG. 5.

FIG. 5 is a diagram illustrating examples of rendering performed successfully and unsuccessfully using the rendering data transferred from transfer source 20 to transfer destinations 30.

As illustrated by example in (a) and (b) of FIG. 5, the transfer source is an automotive navigation system that includes a CPU, a GPU, and an encoder, and the transfer destination is a rear display that includes a CPU and a decoder.

Display system 1 in this example can display a map application screen, information on a sightseeing spot, or a warning in the event of abrupt acceleration on the rear display while vehicle 2 is travelling.

In this case, as illustrated in (a) of FIG. 5, even if the automotive navigation system used as the transfer source transfers an open graphics library (OpenGL) command to the rear display used as the transfer destination in the command transfer mode, the rear display without a GPU is unable to process the OpenGL command. This may result in unsuccessful rendering processing.

In the present embodiment, in contrast, if the automotive navigation system used as transfer source 20 transfers the rendering frames to the rear display used as transfer destination 30 in the stream transfer mode, the decoder of this rear display is able to decode the rendering frames. This results in successful rendering processing.

Furthermore, as illustrated by example in (c) and (d) of FIG. 5, the transfer source is a camera electronic control unit (camera ECU) that includes a CPU and an encoder, and the transfer destination is a head-up display (HUD) that includes a CPU and a GPU.

Display system 1 in this example can display a camera image capturing an area around vehicle 2 on the HUD when vehicle 2 changes lanes or makes a right or left turn while travelling.

In this case, as illustrated in (c) of FIG. 5, even if the camera ECU used as the transfer source transfers the rendering frames to the HUD used as the transfer destination in the stream transfer mode, the HUD without a decoder is unable to process the rendering frames. This may result in unsuccessful rendering processing.

In the present embodiment, in contrast, if the camera ECU used as transfer source 20 transfers the OpenGL command to the HUD used as transfer destination 30 in the command transfer mode, the GPU of this HUD is able to process the OpenGL command. This results in successful rendering processing.

<Functional Effects>

The following describes functional effects of the vehicle display device, the vehicle display method, and the computer program according to the present embodiment.

For example, PTL 1 presents no description on the hardware configuration of the controller included in the display control system. Unfortunately, the processing on the transferred contents may be unsuccessful depending on the hardware configuration provided. In response to this, a vehicle display device according to the present embodiment transfers image information to transfer destination 30 that is a display device included in vehicle 2, the vehicle display device including: transfer mode determiner 25 that determines a transfer mode of the image information suitable for a rendering capability of transfer destination 30, based on the image information, a rendering capability of transfer source 20 that is the vehicle display device, and the rendering capability of transfer destination 30; and transfer processor 27 that converts a preset transfer mode to the transfer mode determined by transfer mode determiner 25, and transfers the image information to transfer destination 30 in the transfer mode as converted.

With this, the rendering data can be transferred to transfer destination 30 in the suitable transfer mode as converted according to the hardware configurations of transfer source 20 and transfer destination 30. Transfer destination 30 obtains the rendering data transferred in the transfer mode suitable for its rendering capability, and thus can perform the rendering processing on the obtained rendering data.

Thus, the vehicle display device enables the rendering processing to be performed by the plurality of display devices having the different rendering capabilities. As a result, transfer destinations 30 can display the images obtained through the rendering processing performed on the rendering data. More specifically, the remote rendering can be achieved between the plurality of display devices.

A vehicle display method according to the present embodiment is a vehicle display method of transferring image information from transfer source 20 to transfer destination 30 that is a display device included in vehicle 2, the vehicle display method including: determining a transfer mode of the image information suitable for a rendering capability of transfer destination 30, based on the image information, a rendering capability of transfer source 20, and the rendering capability of transfer destination 30; and converting a preset transfer mode to the transfer mode determined in the determining, and transferring the image information to transfer destination 30 in the transfer mode as converted in the converting.

This method can achieve the same functional effects as described above.

The computer program according to the present embodiment causes a computer to execute the vehicle display method.

This computer program can also achieve the same functional effects as described above.

If transfer source 20 is able to transfer the image information directly to transfer destination 30 in the transfer mode as converted, transfer mode determiner 25 of the vehicle display device according to the present embodiment determines the transfer mode suitable for the rendering capability of transfer destination 30, based on the image information, the rendering capability of transfer source 20, and the rendering capability of transfer destination 30.

With this, transfer source 20 can transfer the rendering data directly to transfer destination 30 without the repeater. Thus, the system including transfer source 20 and transfer destination 30 is expected to avoid increasing communication traffic and processing load.

Variation 1 of Embodiment

The present variation is different from Embodiment in that rendering data is transferred to transfer destination 30 via repeater 140. The other components according to the present variation are identical to those according to Embodiment unless otherwise specified. The components identical to those described above are assigned reference signs identical to those used in Embodiment, and detailed descriptions on these components are omitted here.

<Functional Configuration>

Figure 6:
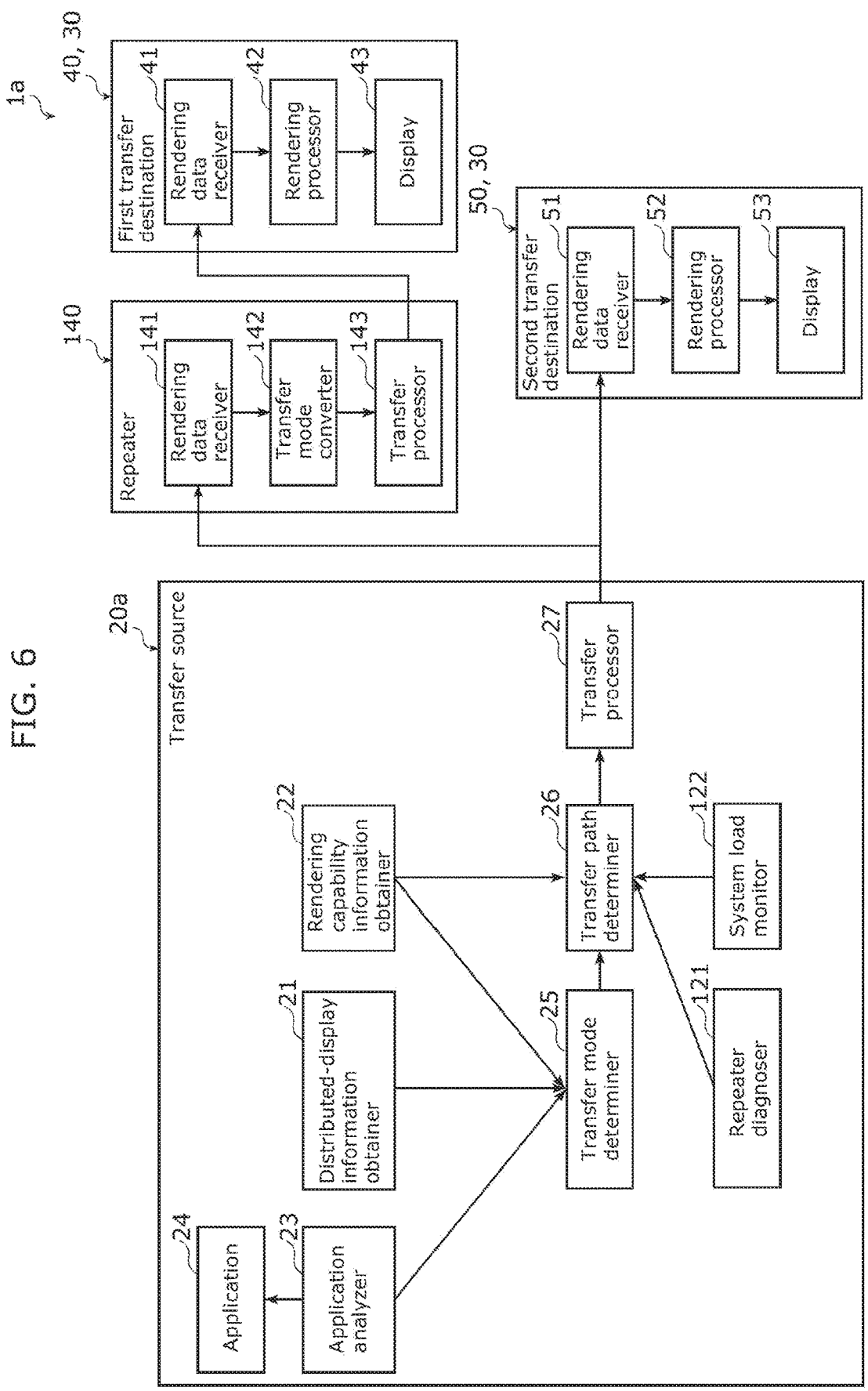
FIG. 6 is a block diagram of a display system according to Variation 1 of Embodiment.

Display system 1a according to the present variation is described with reference to FIG. 6. FIG. 6 is a block diagram of display system 1a according to Variation 1 of Embodiment.

Display system 1a according to the present variation includes repeater 140 used when transfer source 20a is unable to transfer the rendering command and the rendering data directly to transfer destination 30. Repeater 140 performs a relay function between transfer source 20a and transfer destination 30 and thus enables the transfer of the rendering command and rendering data in the transfer mode that allows transfer destination 30 to perform the rendering processing. Repeater 140 is a display device or an in-vehicle device that is included in vehicle 2, for example.

Transfer source 20a of display system 1a according to the present variation is described.

Transfer source 20a includes distributed-display information obtainer 21, rendering capability information obtainer 22, application analyzer 23, application 24, transfer mode determiner 25, transfer path determiner 26, and transfer processor 27. In addition to these, transfer source 20a also includes repeater diagnoser 121 and system load monitor 122.

For the selection of a candidate for repeater 140 from among the display devices and in-vehicle devices of vehicle 2, system load monitor 122 monitors the load on the candidate for repeater 140 and the load on transfer source 20a. Especially if a plurality of candidate repeaters are present, system load monitor 122 monitors the loads on the plurality of candidate repeaters and the load on transfer source 20a. System load monitor 122 outputs repeater information indicating the candidate repeater to transfer path determiner 26. For example, system load monitor 122 may assign priorities to the candidate repeaters according to their loads. System load monitor 122 may output the repeater information indicating the candidate repeater with the minimum load and the repeater information indicating the load for each of the plurality of candidate repeaters, to transfer path determiner 26.

Repeater diagnoser 121 diagnoses the candidate repeater included in the repeater information outputted from system load monitor 122 to transfer path determiner 26. Repeater diagnoser 121 outputs a diagnosis of the diagnosed candidate repeater to transfer path determiner 26. For example, a faulty candidate repeater cannot be used as repeater 140. To exclude such a candidate repeater, repeater diagnoser 121 outputs the diagnosis to transfer path determiner 26.

Transfer path determiner 26 obtains the diagnosis from repeater diagnoser 121, the determined transfer mode from transfer mode determiner 25, and the repeater information from system load monitor 122. Then, transfer path determiner 26 determines the transfer path from transfer source 20a to transfer destination 30. More specifically, based on the diagnosis, the determined transfer mode, and the repeater information, transfer path determiner 26 determines the transfer path from transfer source 20a to transfer destination 30 via repeater 140.

If transfer source 20a is unable to transfer the rendering command and the rendering data directly to transfer destination 30, transfer path determiner 26 selects a candidate repeater from among the plurality of display devices. Then, transfer path determiner 26 determines whether the selected candidate repeater is usable, or more specifically, is able to transfer the rendering command and the rendering data to transfer destination 30 in the transfer mode suitable for the rendering capability of transfer destination 30. To be more specific, transfer path determiner 26 selects the candidate repeater, based on the diagnosis, the determined transfer mode, and the repeater information. Then, based on the diagnosis of the selected candidate repeater, transfer path determiner 26 determines whether the candidate repeater is usable. If determining, based on the diagnosis, that the selected candidate repeater is usable, transfer path determiner 26 determines the transfer path from transfer source 20a to transfer destination 30 via this repeater 140.

In the present variation, if determining that the selected candidate repeater is able to transfer the rendering command and the rendering data to transfer destination 30 in the transfer mode suitable for the rendering capability of transfer destination 30, transfer path determiner 26 determines this candidate repeater to be repeater 140 that is included in the transfer path. Then, as illustrated in FIG. 6, transfer path determiner 26 determines the transfer path from transfer source 20a to first transfer destination 40 via repeater 140 determined. Furthermore, if transfer source 20a is able to transfer the rendering command and the rendering data directly to second transfer destination 50, transfer path determiner 26 determines the transfer path from transfer source 20a to second transfer destination 50.

Transfer path determiner 26 outputs the determined transfer paths and the transfer modes determined by transfer mode determiner 25, to transfer processor 27.

If determining, based on the diagnosis, that the selected candidate repeater is unusable, transfer path determiner 26 selects a next candidate repeater. Then, transfer path determiner 26 obtains the diagnosis of the next candidate repeater from repeater diagnoser 121, and determines whether the next candidate repeater is usable.

Transfer processor 27 transfers the rendering command and the rendering data to transfer destination 30 and repeater 140. As illustrated in FIG. 6, transfer processor 27 according to the present variation transfers the rendering command and the rendering data from transfer source 20a to repeater 140 in a preset transfer mode. Furthermore, transfer processor 27 also transfers the rendering command and the rendering data to second transfer destination 50 in the transfer mode that enables the transfer from transfer source 20*a* to second transfer destination 50.

Next, repeater 140 of display system 1*a* according to the present variation is described.

Display system 1*a* according to the present variation includes repeater 140, in addition to transfer source 20*a* and transfer destinations 30.

Repeater 140 is set by transfer source 20*a* when transfer source 20*a* is unable to transfer the rendering command and the rendering data directly to transfer destination 30. Repeater 140 includes rendering data receiver 141, transfer mode converter 142, and transfer processor 143.

Rendering data receiver 141 receives the determined transfer mode, the determined transfer path, and the rendering command and rendering data transferred from transfer source 20*a*. Rendering data receiver 141 outputs the determined transfer mode, the determined transfer path, and the rendering command and rendering data to transfer mode converter 142.

Transfer mode converter 142 obtains the determined transfer mode, the determined transfer path, and the rendering command and rendering data. Based on the determined transfer mode, transfer mode converter 142 converts the preset transfer mode to the transfer mode determined by transfer mode determiner 25 to be suitable for the rendering capability of transfer destination 30. As illustrated in FIG. 6, transfer mode converter 142 according to the present variation converts the preset transfer mode to the transfer mode that enables the transfer from repeater 140 to first transfer destination 40.

Based on the determined transfer path, transfer processor 143 transfers the rendering command and the rendering data to first transfer destination 40 in the transfer mode as converted by transfer mode converter 142, or more specifically, in the transfer mode that enables the transfer from repeater 140 to first transfer destination 40.

<Processing Operation>

The processing operation of the vehicle display device, the vehicle display method, and the computer program according to the present variation is described with reference to FIG. 6 and FIG. 7.

Figure 7:
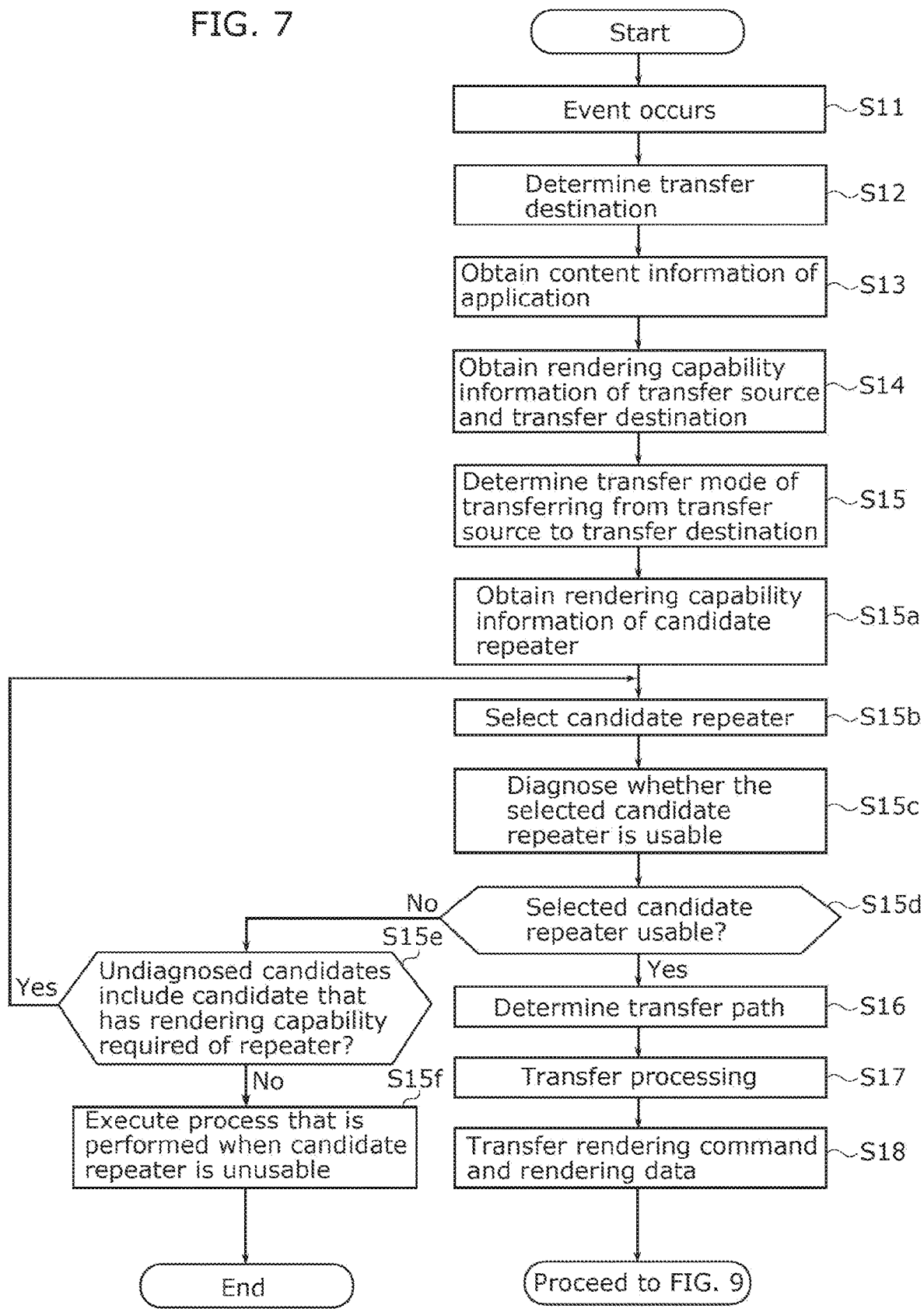
FIG. 7 is a flowchart of a processing operation performed by a transfer source according to Variation 1 of Embodiment.

FIG. 7 is a flowchart of a processing operation performed by transfer source 20*a* according to Variation 1 of Embodiment.

Processes in this example operation that are identical to those in FIG. 3 are assigned reference marks identical to those used in FIG. 3, and thus descriptions on these processes are omitted as appropriate. In this example operation, repeater 140 is interposed between transfer source 20*a* and first transfer destination 40. Note that this example operation is merely an example and that repeater 140 may be interposed between transfer source 20*a* and second transfer destination 50.

After the processes of Steps S11 to S15, repeater diagnoser 121 obtains the rendering capability information on repeater 140 indicated in the repeater information outputted from system load monitor 122 to transfer path determiner 26 (S15*a*).

Next, if transfer source 20*a* is unable to transfer the rendering data directly to first transfer destination 40, transfer path determiner 26 selects a candidate repeater from among the plurality of display devices (S15*b*). Transfer path determiner 26 selects one candidate repeater from among at least one candidate repeater indicated in the repeater information obtained from system load monitor 122. Transfer path determiner 26 outputs the information indicating the selected candidate repeater to repeater diagnoser 121.

Next, based on the information indicating the selected candidate repeater, repeater diagnoser 121 diagnoses whether the selected candidate repeater is usable (S15*c*). For example, repeater diagnoser 121 diagnoses the rendering capability of the selected candidate repeater and determines whether the selected candidate repeater is faulty. Repeater diagnoser 121 outputs the diagnosis of the selected candidate repeater to transfer path determiner 26.

Next, transfer path determiner 26 determines whether the candidate repeater selected in Step S15*b* is able to transfer the rendering data to first transfer destination 40 in the transfer mode suitable for the rendering capability of first transfer destination 40. To be more specific, transfer path determiner 26 determines whether the selected candidate repeater is usable, based on the obtained diagnosis (S15*d*).

If determining that the selected candidate repeater is not usable (NO in Step S15*d*), transfer path determiner 26 determines whether undiagnosed candidates include a candidate having the rendering capability required of repeater 140 (S15*e*).

If determining that the undiagnosed candidates include the candidate having the rendering capability required of repeater 140 (YES in 515*e*), transfer path determiner 26 returns to Step S15*b*.

In contrast, if determining that the undiagnosed candidates include no candidate having the rendering capability required of repeater 140 (NO in 515*e*), transfer path determiner 26 executes a process that is performed when the candidate repeater is unusable (S15*f*). Then, the processing operation of first transfer destination 40 is ended according to the flowchart of FIG. 7.

Referring back to Step S15*d*, if determining that the selected candidate repeater is able to transfer the rendering data to first transfer destination 40 in the transfer mode suitable for the rendering capability of first transfer destination 40, transfer path determiner 26 determines the candidate repeater to be repeater 140 included in the transfer path. Transfer path determiner 26 also determines the transfer path from transfer source 20*a* to first transfer destination 40 via repeater 140 determined. More specifically, if transfer path determiner 26 determines that the selected candidate repeater is usable (YES in Step S15*d*), transfer source 20*a* performs Steps S16 to S18 and then ends the processing operation of transfer source 20*a* according to the flowchart of FIG. 7. Then, repeater 140 starts the processing operation according to the flowchart of FIG. 8.

Figure 8:
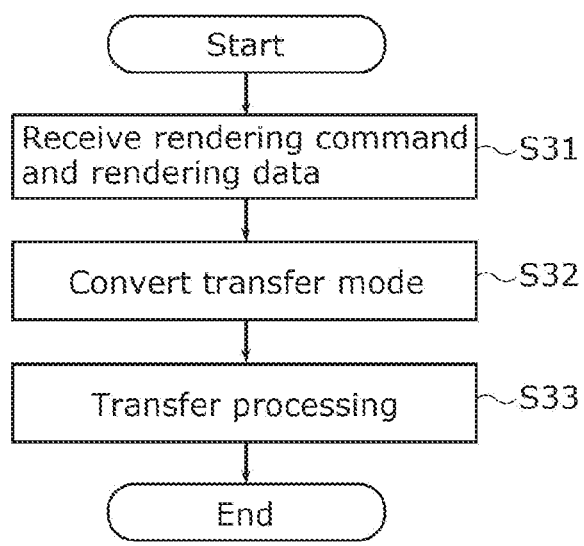
FIG. 8 is a flowchart of a processing operation performed by a repeater according to Variation 1 of Embodiment.

FIG. 8 is a flowchart of the processing operation performed by repeater 140 according to Variation 1 of Embodiment.

As illustrated in FIG. 8, rendering data receiver 141 of repeater 140 receives the determined transfer mode, the determined transfer path, and the rendering command and rendering data transferred from transfer source 20*a* (S31). Rendering data receiver 141 outputs the determined transfer mode, the determined transfer path, and the rendering command and rendering data to transfer mode converter 142.

Next, transfer mode converter 142 obtains the determined transfer mode, the determined transfer path, and the received rendering command and rendering data. Based on the determined transfer mode, transfer mode converter 142 converts the preset transfer mode to the transfer mode determined by transfer mode determiner 25 to be suitable for the rendering capability of transfer destination 30 (S32).

Next, transfer processor 143 transfers the rendering command and the rendering data to transfer destination 30 in the transfer mode as converted by transfer mode converter 142 (S33). Then, repeater 140 ends the processing operation according to the flowchart of FIG. 8, and first transfer destination 40 ends the processing operation according to the flowchart of FIG. 4.

Figure 9:
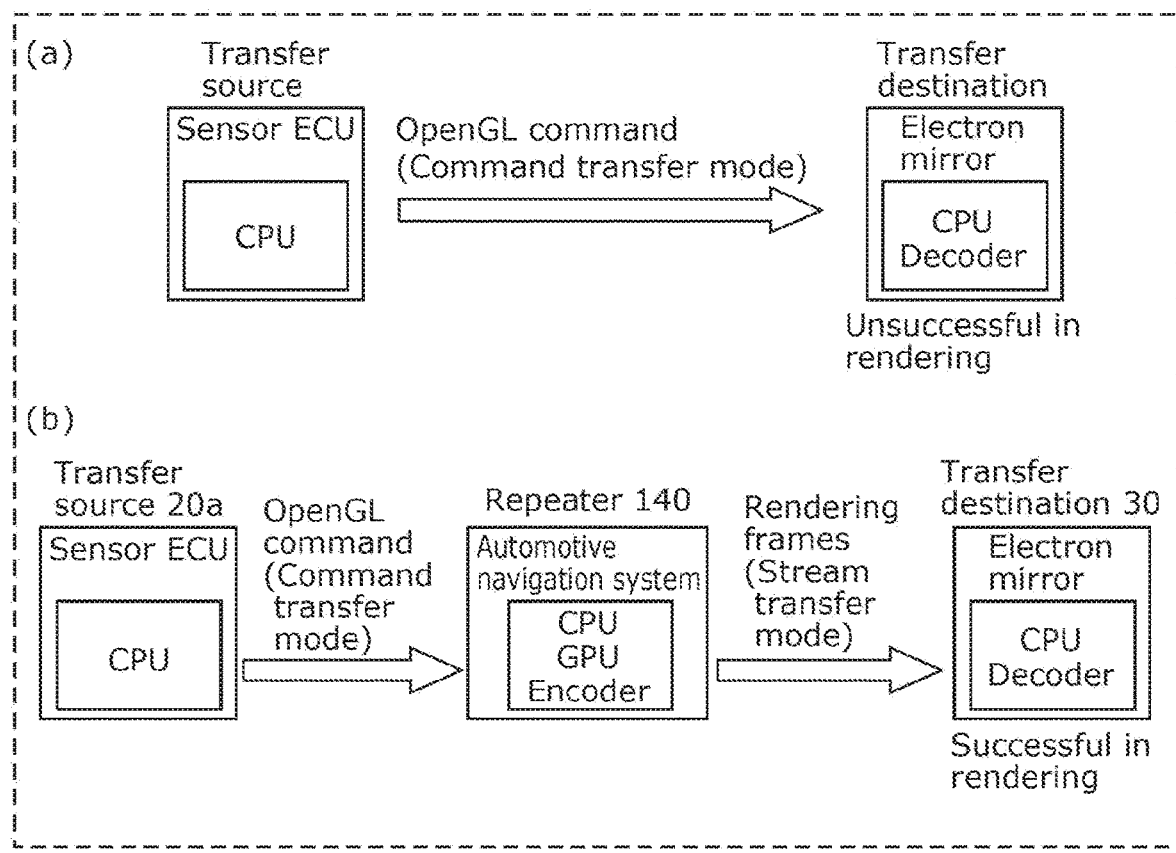
FIG. 9 is another diagram illustrating examples of rendering performed successfully and unsuccessfully using rendering data transferred from the transfer source to the transfer destinations.

The following describes in detail the processing performed by the vehicle display device, the vehicle display method, and the computer program when vehicle 2 is actually driven, with reference to FIG. 9.

FIG. 9 is a diagram illustrating examples of rendering performed successfully and unsuccessfully using the rendering data transferred from transfer source 20a to transfer destinations 30.

As illustrated by example in (a) and (b) of FIG. 9, the transfer source is a sensor ECU that includes a CPU, and the transfer destination is an electron mirror that includes a CPU and a decoder.

If vehicle 2 approaches a vehicle in front while the user is looking in the electron mirror of display system 1a in this example, a graphical warning can be displayed on the electron mirror.

In this case, as illustrated in (a) of FIG. 9, even if the sensor ECU used as the transfer source transfers an OpenGL command to the electron mirror used as the transfer destination in the command transfer mode, the electron mirror without a GPU is unable to process the OpenGL command. This may result in unsuccessful rendering processing.

In the present variation as illustrated in (b) of FIG. 9, in contrast, if repeater 140 is an automotive navigation system that includes a CPU, a GPU, and an encoder, the sensor ECU used as transfer source 20a transfers the OpenGL command to repeater 140 in the command transfer mode. Then, the automotive navigation system used as repeater 140 converts the command transfer mode to the stream transfer mode, and transfers the rendering frames to transfer destination 30 in the stream transfer mode. The decoder included in the electron mirror used as transfer destination 30 is able to process the rendering frames. This results in successful rendering processing.

<Functional Effects>

The following describes functional effects of the vehicle display device, the vehicle display method, and the computer program according to the present variation.

As described above, vehicle 2 includes the plurality of display devices. The vehicle display device according to the present variation includes transfer path determiner 26 that determines a transfer path from transfer source 20a to transfer destination 30. If transfer source 20a is unable to transfer the image information directly to transfer destination 30, transfer mode determiner 25 selects a candidate repeater from among the plurality of display devices and determines whether the candidate repeater selected is able to transfer the image information to transfer destination 30 in the transfer mode suitable for the rendering capability of transfer destination 30.

With this, after the candidate repeater is selected, it is determined whether this candidate repeater is usable. If the candidate repeater is usable, the rendering data can be transferred via repeater 140 from transfer source 20a to transfer destination 30 even if transfer source 20a is unable to transfer the rendering data directly to transfer destination 30.

If determining that the candidate repeater selected is able to transfer the image information to transfer destination 30 in the transfer mode suitable for the rendering capability of transfer destination 30, transfer path determiner 26 of the vehicle display device according to the present variation determines the candidate repeater as repeater 140 that is included in the transfer path and determines the transfer path from transfer source 20a to transfer destination 30 via repeater 140 determined.

With this, the transfer path from transfer source 20a to transfer destination 30 via repeater 140 is determined according to the hardware configurations of transfer source 20a, repeater 140, and transfer destination 30. This enables the transfer of the rendering data via repeater 140 from transfer source 20a to transfer destination 30 even if transfer source 20a is unable to transfer the rendering data directly to transfer destination 30. As a result, transfer destination 30 can display the image obtained through the rendering processing performed on the rendering data.

Transfer mode determiner 25 of the vehicle display device according to the present variation determines the transfer mode suitable for the rendering capability of transfer destination 30, based on the image information, the rendering capability of transfer source 20a, and the rendering capability of transfer destination 30. Repeater 140 determined by transfer path determiner 26 converts the preset transfer mode to the transfer mode determined by transfer mode determiner 25 to be suitable for the rendering capability of transfer destination 30, and transfers the image information to transfer destination 30 in the transfer mode as converted.

With this, the rendering data can be transferred to transfer destination 30 in the transfer mode as converted according to the hardware configurations of repeater 140 and transfer destination 30. Transfer destination 30 can obtain the rendering data in the transfer mode suitable for its rendering capability and thus can process the obtained rendering data. For example, the vehicle display device according to the present variation enables the remote rendering between the plurality of display devices even if transfer source 20a is unable to transfer the rendering data directly to transfer destination 30.

The present variation can achieve the same functional effects as described above.

Variation 2 of Embodiment

The present variation is different from Variation 1 of Embodiment in that: a rendering command and rendering data are transferred to first transfer destination 40 via second transfer destination 250 serving as a repeater; and second transfer destination 250 serving as a display device displays an image indicated by the rendering data. The other components according to the present variation are identical to those according to Embodiment and Variation 1 unless otherwise specified. The components identical to those described above are assigned reference signs identical to those used in Embodiment and Variation 1, and detailed descriptions on these components are omitted here.

<Functional Configuration>

Figure 10:
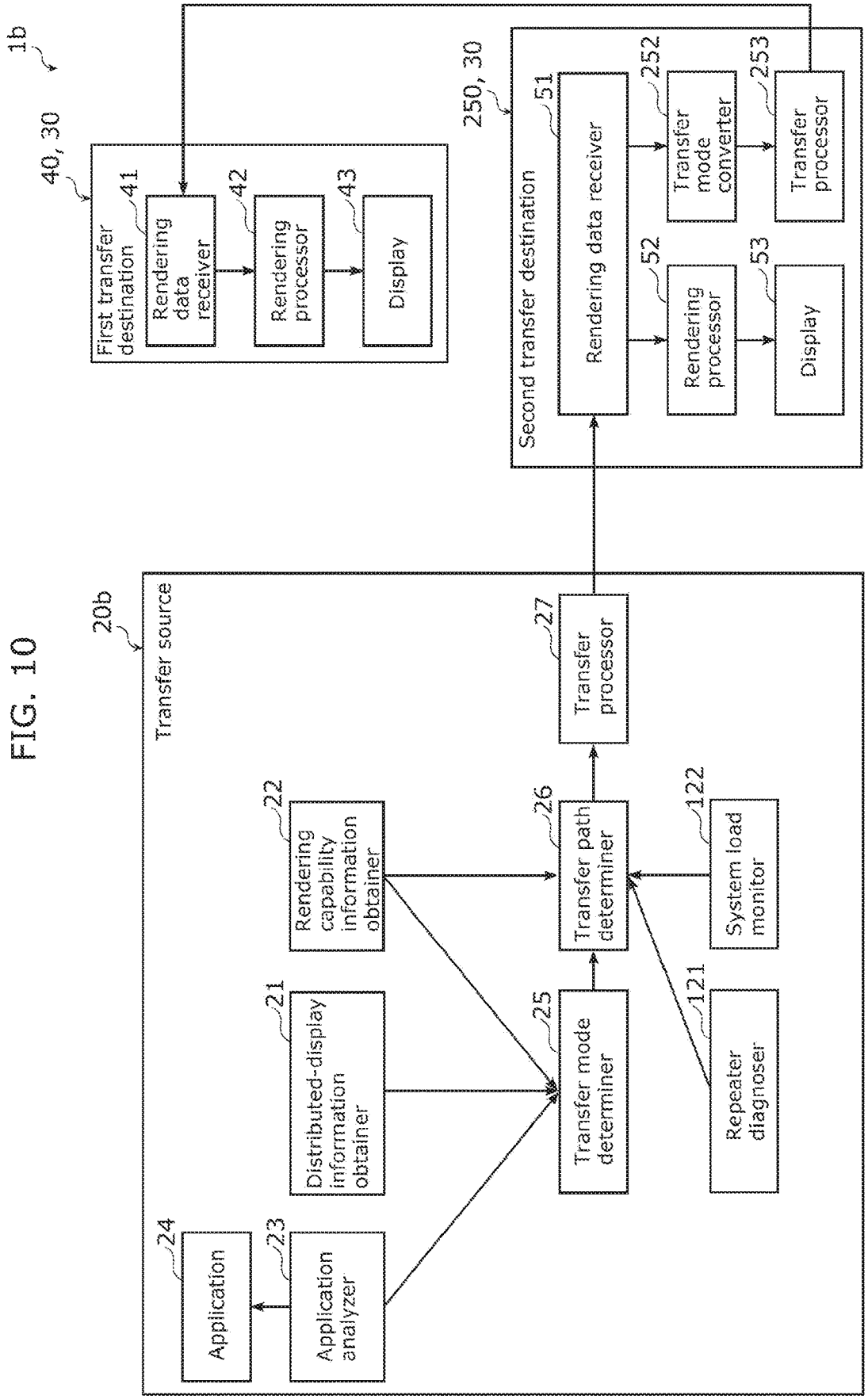
FIG. 10 is a block diagram of a display system according to Variation 2 of Embodiment.

Display system 1b according to the present variation is described with reference to FIG. 10. FIG. 10 is a block diagram of display system 1b according to Variation 2 of Embodiment.

In the present variation, second transfer destination 250 serves as both the repeater and the display device, and first transfer destination 40 is the final destination as transfer destination 30. Note that first transfer destination 40 may serve as both the repeater and the display device and that second transfer destination 250 may be the final destination as transfer destination 30.

Second transfer destination 250 serving as the repeater according to the present variation displays first rendering data included in the rendering data obtained from transfer source 20*b*. Furthermore, second transfer destination 250 converts the transfer mode into the transfer mode determined by transfer mode determiner 25 to be suitable for the rendering capability of transfer destination 30. Then, second transfer destination 250 transfers, to transfer destination 30, second rendering data included in the rendering data in the transfer mode as converted. The first rendering data is an example of first image information, and the second rendering data is an example of second image information.

More specifically, second transfer destination 250 includes rendering data receiver 51, rendering processor 52, display 53, transfer mode converter 252, and transfer processor 253.

Rendering data receiver 51 receives the determined transfer mode, the determined transfer path, and the rendering command and rendering data (the first rendering data and the second rendering data) transferred from transfer source 20*b*. Rendering data receiver 51 outputs the rendering command and the first rendering data to rendering processor 52. Furthermore, rendering data receiver 51 outputs the determined transfer mode, the determined transfer path, and the rendering command and second rendering data to transfer mode converter 252.

Rendering processor 52 performs the rendering processing to adjust a display style of the first rendering data, based on the rendering command. Rendering processor 52 outputs an image obtained through the rendering processing performed on the first rendering data, to display 53.

Display 53 displays the image obtained from rendering processor 52.

Transfer mode converter 252 obtains the determined transfer mode, the determined transfer path, and the rendering command and second rendering data. Based on the determined transfer mode, transfer mode converter 252 converts a preset transfer mode to the determined transfer mode. As illustrated in FIG. 10 in the present variation, transfer mode converter 252 converts the preset transfer mode to the determined transfer mode that enables the transfer from second transfer destination 250 to first transfer destination 40. Transfer processor 253 transfers the rendering command and the second rendering data to first transfer destination 40 in the transfer mode as converted by transfer mode converter 252, or more specifically, in the transfer mode that enables the transfer from second transfer destination 250 to first transfer destination 40.

<Functional Effects>

The following describes functional effects of the vehicle display device, the vehicle display method, and the computer program according to the present variation.

As described above, the repeater determined by transfer path determiner 26 of the vehicle display device according to the present variation includes display 53 that displays first image information included in the image information obtained from transfer source 20*b*. The repeater converts the preset transfer mode to the transfer mode determined by transfer mode determiner 25 to be suitable for the rendering capability of transfer destination 30, and transfers second image information included in the image information to transfer destination 30 in the transfer mode as converted.

With this, second transfer destination 250 illustrated in FIG. 10 serves as both the repeater and the display device, for example. This enables second transfer destination 250 to display the first image information obtained from transfer source 20*b* and also display the second image information obtained from transfer source 20*b*. Furthermore, the rendering data can be transferred to first transfer destination 40 in the suitable transfer mode as converted according to the hardware configurations of the repeater and transfer destination 30.

The present variation can achieve the same functional effects as described above.

Variation 3 of Embodiment

The present variation is different from Embodiment and Variations 1 and 2 in that "raw data" is transferred to first transfer destination 40 in the absence of a usable repeater. The other components according to the present variation are identical to those according to Embodiment and Variations 1 and 2 unless otherwise specified. The components identical to those described above are assigned reference signs identical to those used in Embodiment and Variations 1 and 2, and detailed descriptions on these components are omitted here. Note that first transfer destination 40 is described as an example of transfer destination 30 in the present variation. However, second transfer destination 50 may be used as an example of transfer destination 30.

<Functional Configuration>

Figure 11:
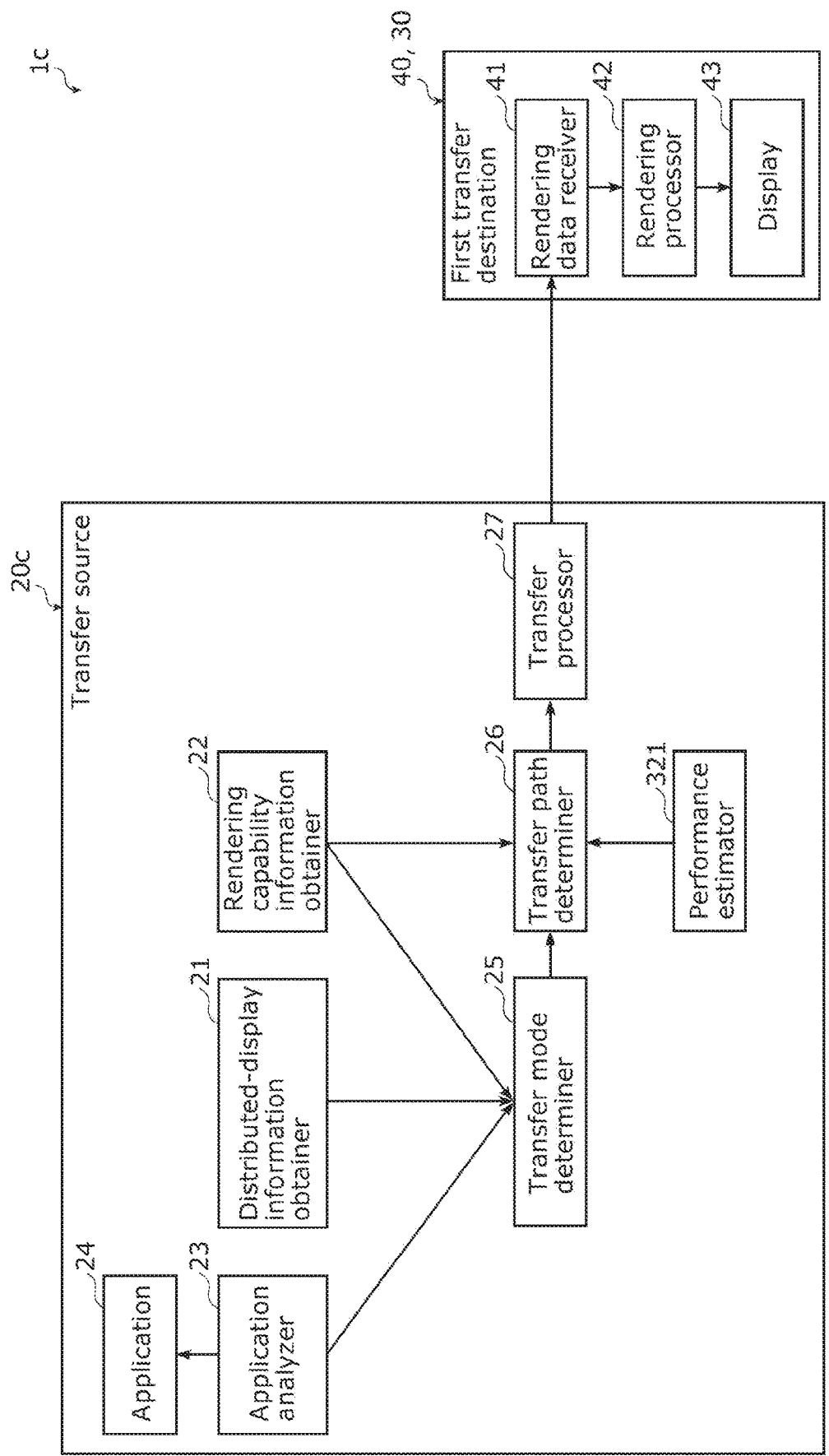
FIG. 11 is a block diagram of a display system according to Variation 3 of Embodiment.

Display system 1*c* according to the present variation is described with reference to FIG. 11. FIG. 11 is a block diagram of display system 1*c* according to Variation 3 of Embodiment.

In the present variation, display system 1*c* does not include a repeater that is able to transfer rendering data to first transfer destination 40 in the transfer mode suitable for the rendering capability of first transfer destination 40. In this case, transfer source 20*c* estimates a frame rate of first transfer destination 40 and then determines, based on the estimated frame rate, whether to transfer the content information as raw data.

More specifically, transfer source 20*a* includes distributed-display information obtainer 21, rendering capability information obtainer 22, application analyzer 23, application 24, transfer mode determiner 25, transfer path determiner 26, and transfer processor 27. In addition to these, transfer source 20*a* also includes performance estimator 321.

Performance estimator 321 obtains performance information indicating performance of first transfer destination 40 from first transfer destination 40 or a storage. Then, based on the performance information indicating the performance of first transfer destination 40, performance estimator 321 estimates a frame rate of first transfer destination 40. Performance estimator 321 outputs the estimation result of the frame rate of first transfer destination 40 to transfer path determiner 26.

If the frame rate of first transfer destination 40 is higher than a predetermined threshold value, transfer path determiner 26 transfers the raw data directly to first transfer destination 40 in the determined transfer path. To be more specific, if transfer path determiner 26 determines that the selected candidate repeater is unable to transfer the rendering data to first transfer destination 40 in the transfer mode suitable for the rendering capability of first transfer destination 40, transfer source 20*c* transfers the raw data to first transfer destination 40 without converting the transfer mode.

If the frame rate of first transfer destination 40 is lower than or equal to the predetermined threshold value, transfer path determiner 26 aborts the transfer of the rendering data and raw data to first transfer destination 40.

<Functional Effects>

The following describes functional effects of the vehicle display device, the vehicle display method, and the computer program according to the present variation.

As described above, if transfer path determiner 26 of the vehicle display device according to the present variation determines that the candidate repeater selected is unable to transfer the image information to transfer destination 30 in the transfer mode suitable for the rendering capability of transfer destination 30, transfer source 20c transfers the image information to transfer destination 30 without converting the transfer mode.

With this, the raw data is transferred to transfer destination 30 having low performance specifications. This enables transfer destination 30 to display the image based on the raw data.

The vehicle display device according to the present variation includes performance estimator 321 that estimates a frame rate of transfer destination 30, based on performance information indicating performance of transfer destination 30. If the frame rate of transfer destination 30 is higher than a predetermined threshold value, transfer source 20c transfers the image information to transfer destination 30.

For example, if the frame rate of transfer destination 30 is higher than the predetermined threshold value, the raw data is transferred to transfer destination 30, and transfer destination 30 is still able to display the image based on the raw data. On this account, if the estimated frame rate of transfer destination 30 is higher than the predetermined threshold value, the raw data may be transferred to transfer destination 30, which can thereby display the image based on the raw data.

The present variation can achieve the same functional effects as described above.

Variation 4 of Embodiment

The present variation is different from Variation 3 of Embodiment in that a new transfer destination is displayed. The other components according to the present variation are identical to those according to Variation 3 unless otherwise specified. The components identical to those described above are assigned reference signs identical to those used in Variation 3, and detailed descriptions on these components are omitted here.

<Functional Configuration>

Figure 12:
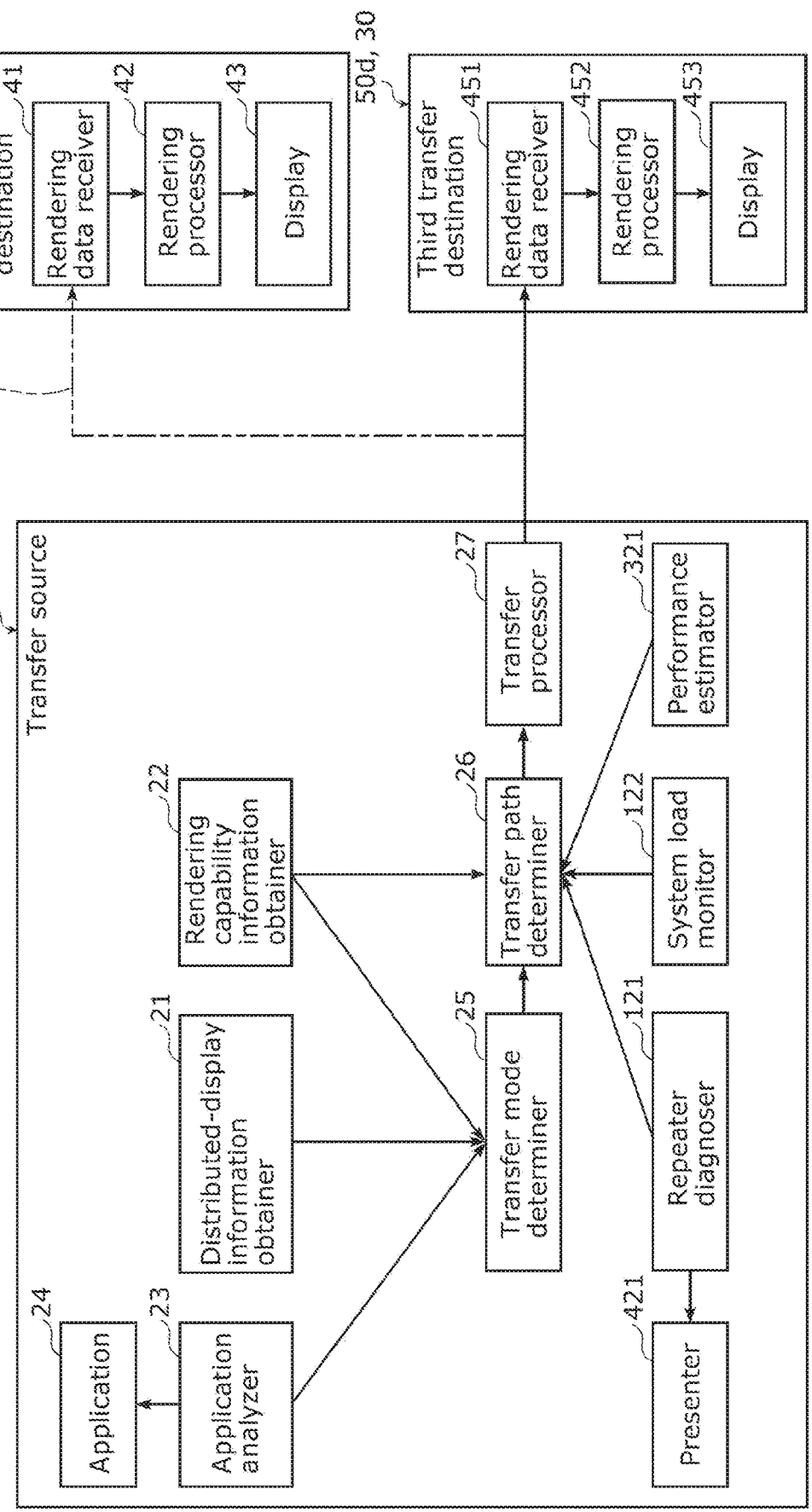
FIG. 12 is a block diagram of a display system according to Variation 4 of Embodiment.

Display system 1d according to the present variation is described with reference to FIG. 12. FIG. 12 is a block diagram of display system 1d according to Variation 4 of Embodiment.

In the present variation, display system 1d does not include a repeater that is able to transfer rendering data to transfer destination 30 in the transfer mode suitable for the rendering capability of transfer destination 30. First transfer destination 40 is described as an example of transfer destination 30 in the present variation. However, second transfer destination 50 may be used as an example of transfer destination 30 in the present variation.

In this case, transfer source 20d estimates a frame rate of first transfer destination 40 and then determines, based on the estimated frame rate, whether to transfer the content information as raw data.

Transfer source 20d includes distributed-display information obtainer 21, rendering capability information obtainer 22, application analyzer 23, application 24, transfer mode determiner 25, transfer path determiner 26, transfer processor 27, repeater diagnoser 121, and system load monitor 122.

In addition to these, transfer source 20d also includes performance estimator 321 and presenter 421.

If transfer path determiner 26 determines that the selected candidate repeater is unable to transfer the rendering data to first transfer destination 40 in the transfer mode suitable for the rendering capability of first transfer destination 40, transfer source 20d transfers the raw data to first transfer destination 40 without converting the transfer mode.

To be more specific, if repeater diagnoser 121 determines that all candidate repeaters selected by transfer path determiner 26 are unusable, this means that the plurality of display devices do not include a repeater that is able to transfer the rendering data to first transfer destination 40 in the transfer mode suitable for the rendering capability of first transfer destination 40.

In this case, transfer path determiner 26 determines a transfer path from transfer source 20d to first transfer destination 40 without a repeater. Transfer path determiner 26 transfers the raw data of the content information directly to first transfer destination 40 in the determined transfer path. The raw data is an example of the image information.

Furthermore, performance estimator 321 obtains performance information indicating performance of first transfer destination 40 from first transfer destination 40 or a storage. Then, based on the performance information indicating the performance of first transfer destination 40, performance estimator 321 estimates a frame rate of first transfer destination 40. Performance estimator 321 outputs the estimation result of the frame rate of first transfer destination 40 to transfer path determiner 26.

If the frame rate of first transfer destination 40 is higher than a predetermined threshold value, this means that the components including the CPU of first transfer destination 40 have adequate rendering processing capacity. Thus, if the frame rate of first transfer destination 40 is higher than the predetermined threshold value, transfer path determiner 26 transfers the raw data directly to first transfer destination 40 in the determined transfer path.

In contrast, if the frame rate of first transfer destination 40 is lower than or equal to the predetermined threshold value, this means that the components including the CPU of first transfer destination 40 do not have adequate rendering processing capacity. Thus, as indicated by the chain double-dashed line in FIG. 12, transfer path determiner 26 determines that the data is undisplayable and aborts the transfer of the rendering data and raw data to first transfer destination 40 if the frame rate of first transfer destination 40 is lower than or equal to the predetermined threshold value. At this time, if transfer path determiner 26 determines that the selected candidate repeater is unable to transfer the rendering data and raw data to first transfer destination 40 in the transfer mode suitable for the rendering capability of first transfer destination 40, transfer source 20d outputs a list of new transfer destinations that are included among the plurality of display devices. To be more specific, the hardware information of the rendering capability information includes the name of the display device, and transfer source 20d can thereby output the list of the new transfer destinations. This allows the user to select third transfer destination 50d that displays the rendering data, from the list of the new transfer destinations.

Transfer source 20d notifies presenter 421 that the transfer of the rendering data and raw data has been aborted. Presenter 421 is a display device or a sound device, for example. If presenter 421 is a display device included in vehicle 2, transfer source 20d may cause presenter 421 to display a notification indicating that the transfer of the rendering data and raw data has been aborted. Alternatively, if presenter 421 is a sound device included in vehicle 2, transfer source 20d may cause presenter 421 to output a notification indicating that the transfer of the rendering data and raw data has been aborted with sound.

If transfer path determiner 26 determines that the selected candidate repeater is unable to transfer the image information to first transfer destination 40 in the transfer mode suitable for the rendering capability of first transfer destination 40, transfer source 20d notifies presenter 421 that the repeater is unusable. For example, transfer source 20d may cause the display device included in vehicle 2 to display a notification indicating that the repeater is unusable. Alternatively, transfer source 20d may cause the sound device included in vehicle 2 to output a notification indicating that the repeater is unusable with sound.

<Processing Operation>

The processing operation of the vehicle display device, the vehicle display method, and the computer program according to the present variation is described with reference to FIG. 12 and FIG. 13.

Figure 13:
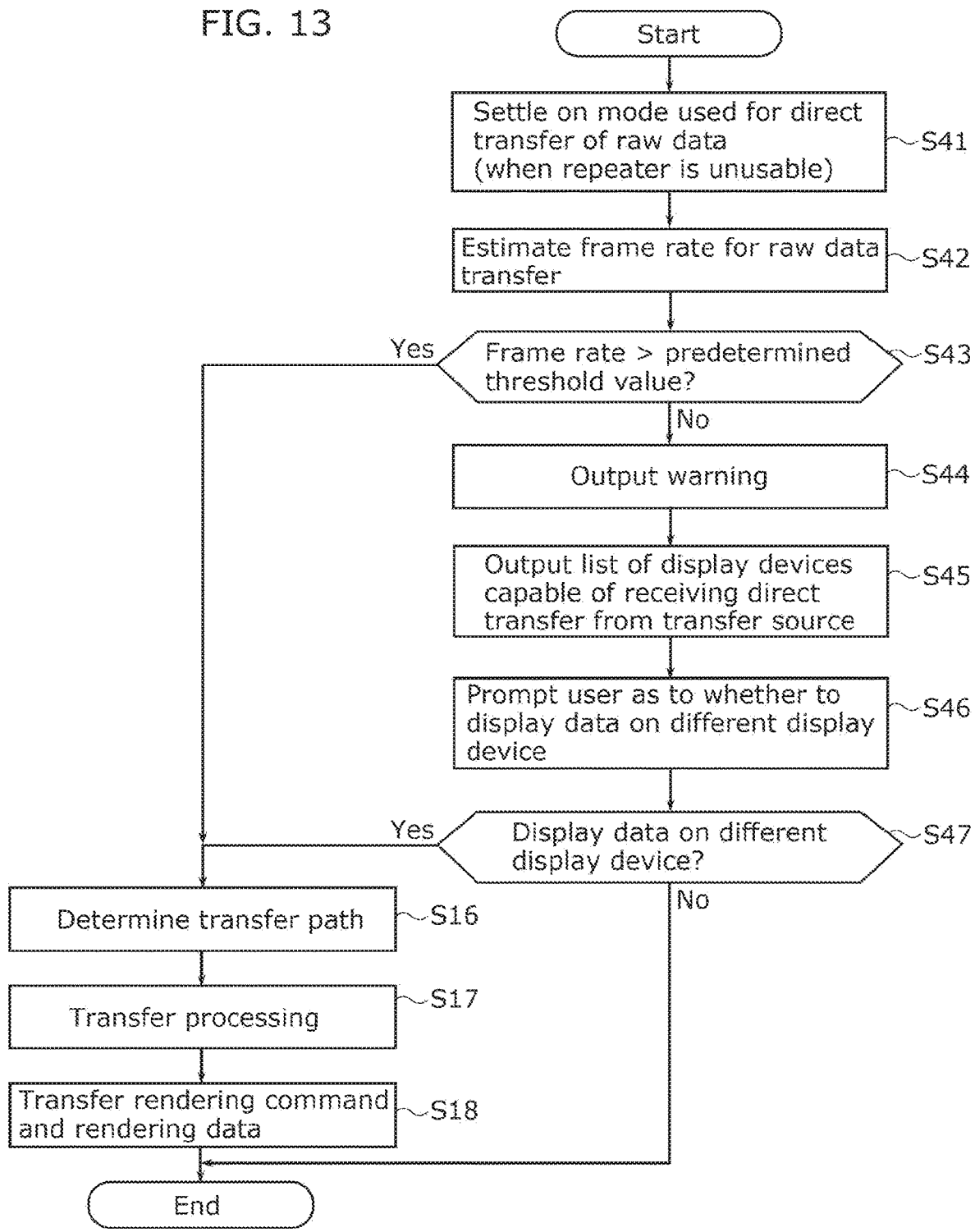
FIG. 13 is a flowchart of a processing operation performed by a transfer source according to Variation 4 of Embodiment.

FIG. 13 is a flowchart of a processing operation performed by transfer source 20d according to Variation 4 of Embodiment. Processes in this example operation that are identical to those in FIG. 3 are assigned reference marks identical to those used in FIG. 3, and thus descriptions on these processes are omitted as appropriate here.

If determining, based on the diagnosis obtained from repeater diagnoser 121, that the selected candidate repeater is unusable, transfer path determiner 26 settles on the transfer mode that enables the direct transfer of the raw data of the content information (S41). To be more specific, transfer path determiner 26 determines the transfer path that allows the raw data to be transferred from transfer source 20d directly to first transfer destination 40.

Next, performance estimator 321 estimates a frame rate of first transfer destination 40 for the raw data to be transferred from transfer source 20d directly to first transfer destination 40 (S42). Performance estimator 321 outputs the estimated frame rate to transfer path determiner 26.

Next, transfer path determiner 26 determines whether the frame rate of first transfer destination 40 is higher than the predetermined threshold value (S43).

If transfer path determiner 26 determines that the frame rate of first transfer destination 40 is higher than the predetermined threshold value (YES in S43), transfer source 20d performs Steps S16 to S18 and then ends the processing operation of transfer source 20d according to the flowchart of FIG. 13. First transfer destination 40 starts the processing operation according to the flowchart of FIG. 4.

If the frame rate of first transfer destination 40 is lower than or equal to the predetermined threshold value (NO in S43), transfer path determiner 26 aborts the transfer of the rendering data and raw data to first transfer destination 40 (aborts the determination of the transfer path) and thus determines that the data is undisplayable.

Next, repeater diagnoser 121 of transfer source 20d outputs a warning (S44). To be more specific, repeater diagnoser 121 outputs, to presenter 421, the warning indicating that the transfer of the rendering data and raw data has been aborted. This causes presenter 421 to output the notification indicating that the transfer of the rendering data and raw data has been aborted.

Next, repeater diagnoser 121 outputs, to presenter 421, the list of new transfer destinations that are included among the plurality of display devices, or more specifically, the list of the display devices capable of receiving the direct transfer from the transfer source (S45). This allows the user to select, from the list of new transfer destinations, first transfer destination 40 that is able to display the rendering data.

Next, repeater diagnoser 121 prompts the user as to whether to display the rendering data on a different display device (S46). To be more specific, repeater diagnoser 121 causes presenter 421 to present a prompt as to whether to display the rendering data on a different display device.

Next, transfer source 20d determines whether the user selects to display the rendering data on the different display device, which is a new transfer destination (S47). More specifically, transfer source 20d determines whether the user selects, via an operation receiver included in vehicle 2, to display the rendering data on the different display device.

If determining that the user selects to display the rendering data on the different display device (YES in S47), transfer source 20d proceeds to Step S16.

In contrast, if determining that the user does not select to display the rendering data on the different display device (NO in S47), transfer source 20d ends the processing operation according to the flowchart of FIG. 13.

Figure 14:
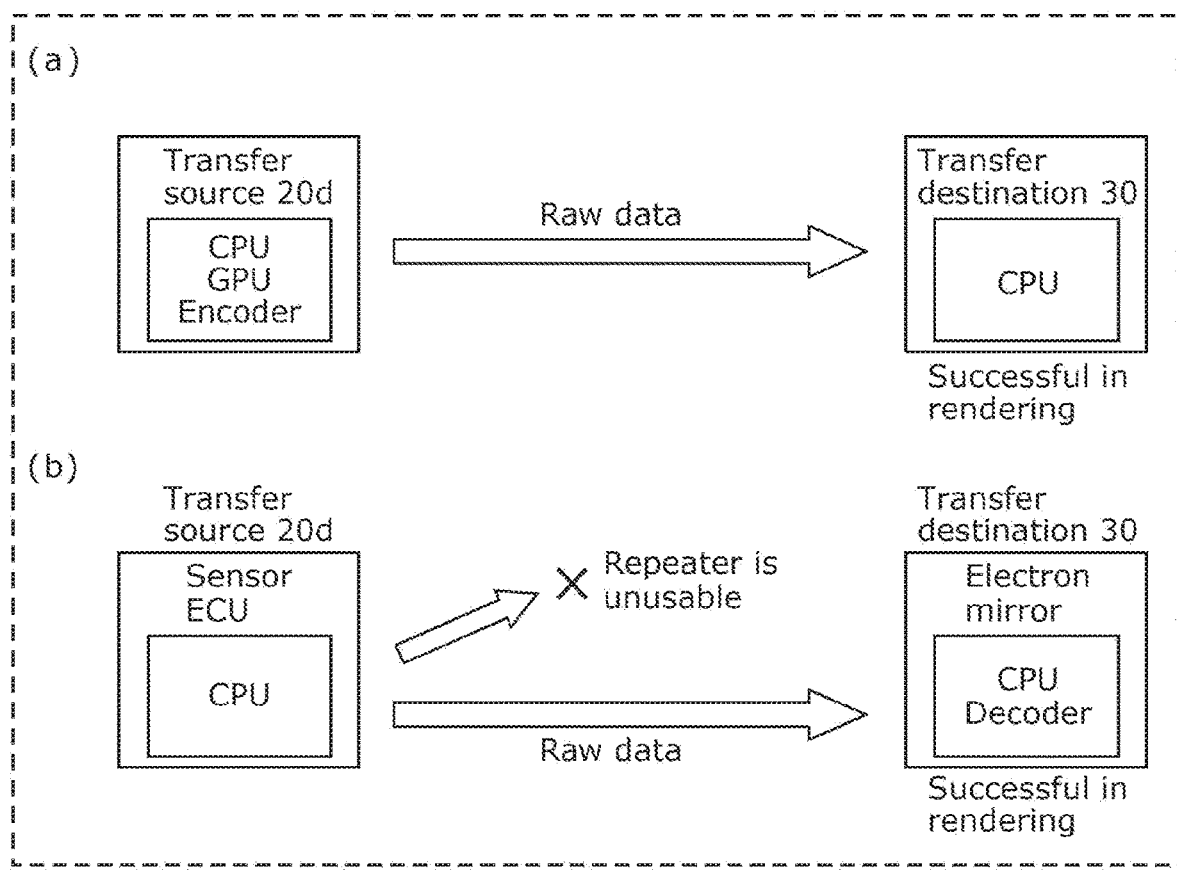
FIG. 14 is still another diagram illustrating examples of rendering performed successfully using rendering data transferred from the transfer source to the transfer destinations.

The following describes in detail the processing performed by the vehicle display device, the vehicle display method, and the computer program when vehicle 2 is actually driven, with reference to FIG. 14. FIG. 14 is another diagram illustrating examples of rendering performed successfully using the rendering data transferred from transfer source 20d to first transfer destination 40.

As illustrated by example in (a) of FIG. 14, transfer source 20d includes a CPU, a GPU, and an encoder, and transfer destination 30 includes a CPU. As illustrated by example in (b) of FIG. 14, a sensor ECU used as transfer source 20d includes a CPU, and an electron mirror used as transfer destination 30 includes a CPU and a decoder.

As illustrated in (a) of FIG. 14 according to the present variation, no repeater is present between the transfer source and the transfer destination, and the transfer destination includes only the CPU. In this case, if the frame rate of transfer destination 30 is higher than the predetermined threshold value, the CPU of transfer source 20d transfers raw RGBA (red, green, blue, and alpha) data. Transfer destination 30 obtains the raw data, and thus succeeds in the rendering processing.

As illustrated in (b) of FIG. 14 according to the present variation, transfer source 20d is the sensor ECU that includes the CPU, and transfer destination 30 is the electron mirror that includes the CPU and the decoder. In this case, if no repeater is present between transfer source 20d and transfer destination 30 and the frame rate of transfer destination 30 is higher than the predetermined threshold value, the sensor ECU of transfer source 20d transfers the raw data to transfer destination 30. Transfer destination 30 obtains the raw data, and thus succeeds in the rendering processing.

<Functional Effects>

The following describes functional effects of the vehicle display device, the vehicle display method, and the computer program according to the present variation.

As described above, if the frame rate of transfer destination 30 is lower than or equal to the predetermined threshold value, transfer source 20d of the vehicle display device according to the present variation aborts transfer of the image information to transfer destination 30 and outputs a notification indicating that the transfer of the image information has been aborted.

With this, the output of the notification about the aborted transfer allows the user to know that transfer destination 30 has failed to display the rendering data as an image. This allows the user to try an alternative.

If transfer path determiner 26 of the vehicle display device according to the present variation determines that the candidate repeater selected is unable to transfer the image information to transfer destination 30 in the transfer mode suitable for the rendering capability of transfer destination 30, transfer source 20d outputs a notification indicating that the repeater is unusable.

With this, the output of the notification that the repeater is unusable allows the user to try to display the rendering data as an image on transfer destination 30 using a different repeater.

If transfer path determiner 26 of the vehicle display device according to the present variation determines that the candidate repeater selected is unable to transfer the image information to transfer destination 30 in the transfer mode suitable for the rendering capability of transfer destination 30, transfer source 20d outputs a list of third transfer destinations 50d included among the plurality of display devices (a list of candidates for third transfer destination 50d).

With this, the user can see the list of third transfer destinations 50d (the list of candidates for third transfer destination 50d). Then, the user can select desired transfer destination 30 from the list of third transfer destinations 50d. This allows transfer destination 30 newly selected to display an image obtained through the rendering processing performed on the rendering data.

The present variation can achieve the same functional effects as described above.

Other Variations

Although the vehicle display device, the vehicle display method, and the computer program according to the present disclosure have been described above based on Embodiment and Variations 1 to 4, the present disclosure is not limited to Embodiment and Variations 1 to 4 described above. Other embodiments implemented through various changes and modifications to Embodiment and Variations 1 to 4 conceived by a person of ordinary skill in the art may be included in the scope in an aspect or aspects according to the present disclosure, unless such changes and modifications depart from the scope of the present disclosure.

Figure 15:
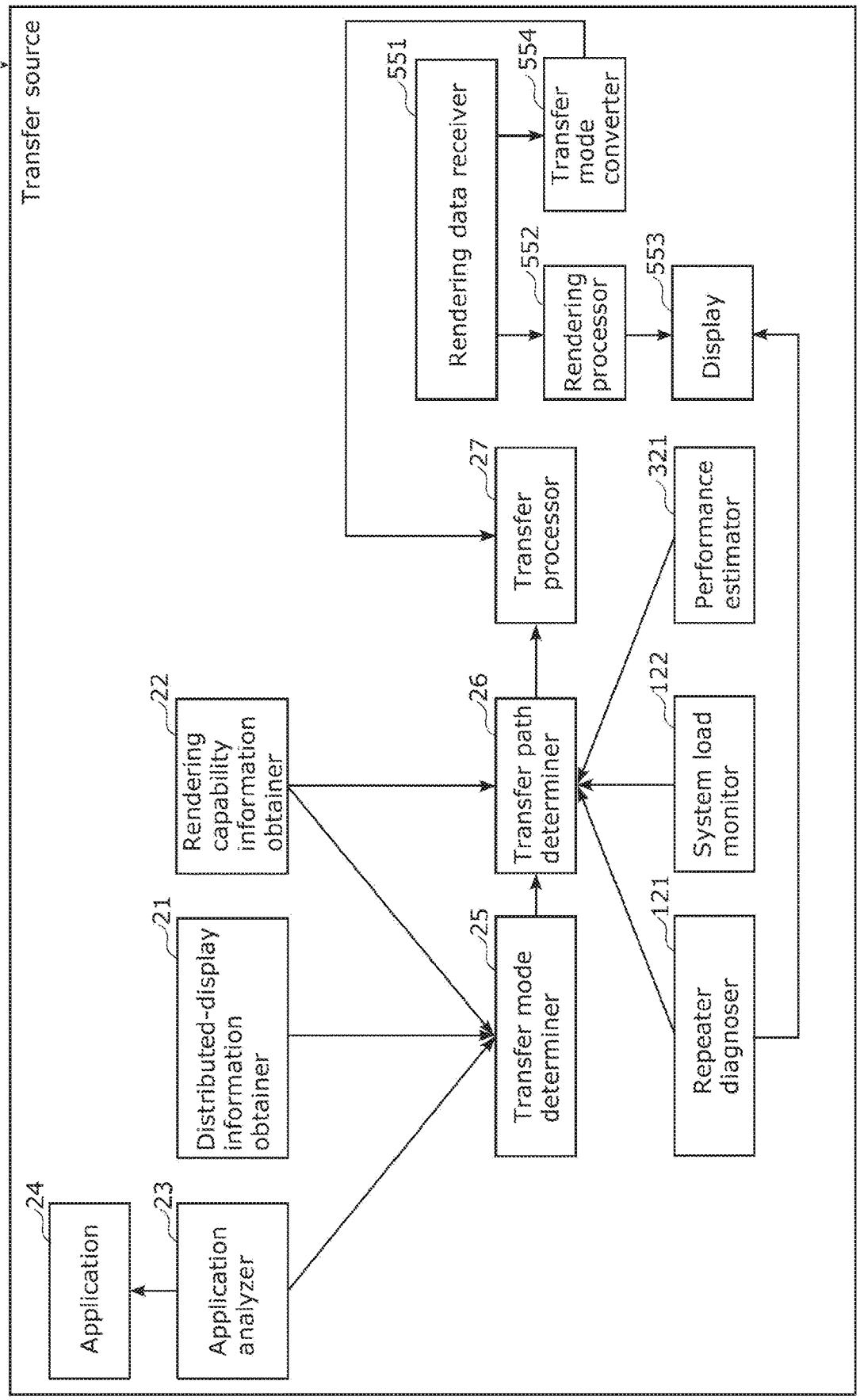
FIG. 15 is a block diagram of a display system according to another variation.

For example, the vehicle display device according to Embodiment and Variations 1 to 4 may have the configuration illustrated in FIG. 15. FIG. 15 is a block diagram of a display system according to another variation. More specifically, transfer source 20e that is the vehicle display device may include distributed-display information obtainer 21, rendering capability information obtainer 22, application analyzer 23, application 24, transfer mode determiner 25, transfer path determiner 26, transfer processor 27, repeater diagnoser 121, system load monitor 122, performance estimator 321, rendering data receiver 551, rendering processor 552, display 553, and transfer mode converter 554. The components included in transfer source 20e may be identical to those described according to Embodiment and Variations 1 to 4.

According to the vehicle display device, the vehicle display method, and the computer program in Embodiment and Variations 1 to 4 described above, the processing in Variations 3 or 4 may be executed as an example of Step S15f of FIG. 7.

According to the vehicle display device, the vehicle display method, and the computer program in Embodiment and Variations 1 to 4 described above, the rendering capability information table includes the configuration information on the virtual machine. On this account, the transfer destination may be able to obtain the rendering command and the rendering data from a cloud server.

The rendering capability information includes the configuration information on the virtual machine. On this account, the transfer destination may be a virtual machine operating in a control device. For example, assume that a hypervisor of the ECU runs a first virtual machine for controlling the HUD and a second virtual machine for controlling the vehicle instruments. In this case, at least one of the first virtual machine and the second virtual machine may be selected as the transfer destination. More specifically, the transfer destination can be selected on a virtual-machine basis, according to the vehicle display device, the vehicle display method, and the computer program in Embodiment and Variations 1 to 4 described above. The virtual machine selected as the transfer destination may obtain the rendering command and the rendering data.

According to the vehicle display device, the vehicle display method, and the computer program in Embodiment and Variations 1 to 4 described above, whether to convert the transfer mode may be determined based on the content information on the application. In this case, the application may store a table that associates transfer modes with content information. The transfer mode determiner may determine the transfer mode by reference to this table obtained by the application analyzer from the application. For the rendering data with a transfer volume greater than a reference volume because of a large number of textures, the command transfer mode may be converted to the stream transfer mode. The stream transfer mode compresses the data to be transferred, and thus is expected to reduce the transfer volume. As another example, for the rendering data that includes an a value for transparency, the command transfer mode may be selected instead of the stream transfer mode in which such data cannot be rendered. The transfer source may set a displayable area or a display limit area among the plurality of display devices according to the type of content information.

According to the vehicle display device, the vehicle display method, and the computer program in Embodiment and Variations 1 to 4 described above, the content information may be transferred from the transfer source to the transfer destination via the repeater if there is no difference or only a tolerable difference in image quality between the command transfer mode and the stream transfer mode.

There may be a chance that the content information to be transferred can cause an intolerable difference in image quality between the command transfer mode and the stream transfer mode. According to the vehicle display device, the vehicle display method, and the computer program in Embodiment and Variations 1 to 4 described above, a warning about the transfer to be aborted may be outputted and then the transfer of the rendering data and raw data via the repeater may be aborted. In this case, a new transfer destination capable of receiving the direct transfer may be determined. Then, the data may be transferred to this new transfer destination at the discretion of the user.

According to the vehicle display device, the vehicle display method, and the computer program in Embodiment and Variations 1 to 4 described above, a plurality of candidate transfer paths may be provided. The transfer path determiner may determine the most suitable transfer path, based on the content information and the rendering capability information. In this case, the repeater diagnoser may diagnose repeaters corresponding to the candidate transfer paths, in descending order of suitability (or more specifically, in order of priority). Then, after the diagnosis has been properly performed, the transfer path determiner may settle on the suitable transfer path. For example, priorities may be assigned to the candidate transfer paths in an ascending order of time taken from when the rendering data is transferred from the transfer source to the transfer destination until when the transfer destination displays the rendering data.

The transfer mode determiner, the transfer path determiner, the transfer processor, the repeater diagnoser, the system load monitor, the performance estimator, the transfer mode converter, and the rendering processor included in the vehicle display device according to Embodiment and Variations 1 to 4 described above are typically implemented into a large scale integration (LSI). These components may be implemented on individual chips. Alternatively, some or all of the components may be implemented on a single chip.

Moreover, the method of circuit integration is not limited to LSI. Integration may be realized with a specialized circuit or a general-purpose processor. After the LSI circuit is manufactured, a field programmable gate array (FPGA) or a reconfigurable processor capable of reconfiguring the connections and settings of the circuit cells in the LSI circuit may be used.

Each of the elements in each of the above embodiments and Variations 1 to 4 may be configured in the form of an exclusive hardware product, or may be realized by executing a software program suitable for the element. Each of the elements may be realized by means of a program executing unit, such as a Central Processing Unit (CPU) or a processor, reading and executing the software program recorded on a recording medium such as a hard disk or semiconductor memory.

The dividing of the functional blocks in each of the block diagrams is one example. It is possible that a plurality of functional blocks are implemented into a single functional block, that a single functional block is divided into a plurality of functional blocks, and that a function executed by a functional block is partially executed by another functional block. Furthermore, similar functions of a plurality of functional blocks may be executed by a single hardware or software in parallel or by time division.

An order of performing the steps in each of the flowcharts is an example for explaining the present disclosure in detail. The steps may be performed in different orders. Different steps among the steps may be performed simultaneously, in other words, in parallel.

Those skilled in the art will readily appreciate that embodiments arrived at by making various modifications to the above embodiments and Variations 1 to 4 or embodiments arrived at by selectively combining elements disclosed in the above embodiments and Variations 1 to 4 without materially departing from the scope of the present disclosure may be included within one or more aspects of the present disclosure.

Additional Remarks

The following describes the features of the vehicle display device, the vehicle display method, and the program according to the above embodiments and Variations 1 to 4.
<Technique 1>
A vehicle display device that transfers image information to a transfer destination that is a display device included in a vehicle, the vehicle display device comprising:

a transfer mode determiner that determines a transfer mode of the image information suitable for a rendering capability of the transfer destination, based on the image information, a rendering capability of a transfer source that is the vehicle display device, and the rendering capability of the transfer destination; and
a transfer processor that converts a preset transfer mode to the transfer mode determined by the transfer mode determiner, and transfers the image information to the transfer destination in the transfer mode as converted.
<Technique 2>
The vehicle display device according to technique 1,
wherein when the transfer source is able to transfer the image information directly to the transfer destination in the transfer mode as converted, the transfer mode determiner determines the transfer mode suitable for the rendering capability of the transfer destination, based on the image information, the rendering capability of the transfer source, and the rendering capability of the transfer destination.
<Technique 3>
The vehicle display device according to technique 1, further comprising:
a transfer path determiner that determines a transfer path from the transfer source to the transfer destination,
wherein the vehicle includes a plurality of display devices including the display device, and
when the transfer source is unable to transfer the image information directly to the transfer destination, the transfer mode determiner selects a repeater as a candidate repeater from among the plurality of display devices and determines whether the candidate repeater selected is able to transfer the image information to the transfer destination in the transfer mode suitable for the rendering capability of the transfer destination.
<Technique 4>
The vehicle display device according to technique 3,
wherein when determining that the candidate repeater selected is able to transfer the image information to the transfer destination in the transfer mode suitable for the rendering capability of the transfer destination, the transfer path determiner determines the candidate repeater as the repeater that is included in the transfer path and determines the transfer path from the transfer source to the transfer destination via the repeater determined.
<Technique 5>
The vehicle display device according to technique 4,
wherein the transfer mode determiner determines the transfer mode suitable for the rendering capability of the transfer destination, based on the image information, the rendering capability of the transfer source, and the rendering capability of the transfer destination, and
the repeater determined by the transfer path determiner converts the preset transfer mode to the transfer mode determined by the transfer mode determiner to be suitable for the rendering capability of the transfer destination, and transfers the image information to the transfer destination in the transfer mode as converted.
<Technique 6>
The vehicle display device according to technique 4 or 5,
wherein the repeater determined by the transfer path determiner
includes a display that displays first image information included in the image information obtained from the transfer source, and converts the preset transfer mode to the transfer mode determined by the transfer mode determiner to be suitable for the rendering capability of the transfer destination, and transfers second image information included in the image information to the transfer destination in the transfer mode as converted.

<Technique 7>

The vehicle display device according to technique 3, wherein when the transfer path determiner determines that the candidate repeater selected is unable to transfer the image information to the transfer destination in the transfer mode suitable for the rendering capability of the transfer destination, the transfer source transfers the image information to the transfer destination without converting the transfer mode.

<Technique 8>

The vehicle display device according to technique 7, further comprising:

a performance estimator that estimates a frame rate of the transfer destination, based on performance information indicating performance of the transfer destination, wherein when the frame rate of the transfer destination is higher than a predetermined threshold value, the transfer source transfers the image information to the transfer destination.

<Technique 9>

The vehicle display device according to technique 8, wherein when the frame rate of the transfer destination is lower than or equal to the predetermined threshold value, the transfer source aborts transfer of the image information to the transfer destination and outputs a notification indicating that the transfer of the image information has been aborted.

<Technique 10>

The vehicle display device according to any one of techniques 7 to 9, wherein when the transfer path determiner determines that the candidate repeater selected is unable to transfer the image information to the transfer destination in the transfer mode suitable for the rendering capability of the transfer destination, the transfer source outputs a notification indicating that the repeater is unusable.

<Technique 11>

The vehicle display device according to any one of techniques 7 to 10, wherein when the transfer path determiner determines that the candidate repeater selected is unable to transfer the image information to the transfer destination in the transfer mode suitable for the rendering capability of the transfer destination, the transfer source outputs a list of new transfer destinations included among the plurality of display devices.

<Technique 12>

A vehicle display method of transferring image information from a transfer source to a transfer destination that is a display device included in a vehicle, the vehicle display method comprising:

determining a transfer mode of the image information suitable for a rendering capability of the transfer destination, based on the image information, a rendering capability of the transfer source, and the rendering capability of the transfer destination; and converting a preset transfer mode to the transfer mode determined in the determining, and transferring the image information to the transfer destination in the transfer mode as converted in the converting.

<Technique 13>

A non-transitory computer-readable recording medium having recorded thereon a computer program for causing a computer to execute the vehicle display method according to technique 12.

While various embodiments have been described herein above, it is to be appreciated that various changes in form and detail may be made without departing from the spirit and scope of the present disclosure as presently or hereafter claimed.

Further Information about Technical Background to this Application

The disclosure of the following patent application including specification, drawings, and claims are incorporated herein by reference in their entirety: Japanese Patent Application No. 2022-157717 filed on Sep. 30, 2022.

INDUSTRIAL APPLICABILITY

The present disclosure is useful to a vehicle that includes a plurality of display devices and to any other device or system that includes a plurality of display devices.

The invention claimed is:

1. A vehicle display device that transfers image information to a transfer destination that is a display device included in a vehicle, the vehicle display device comprising:

a transfer mode determiner that determines a transfer mode of the image information suitable for a rendering capability of the transfer destination, based on the image information, a rendering capability of a transfer source that is the vehicle display device, and the rendering capability of the transfer destination;

a transfer processor that converts a preset transfer mode to the transfer mode determined by the transfer mode determiner, and transfers the image information to the transfer destination in the transfer mode as converted; and a rendering capability information obtainer that obtains, based on hardware information of the transfer source and the transfer destination, the rendering capability of the transfer source and the rendering capability of the transfer destination, wherein the hardware information indicates the presence or absence of a central processing unit (CPU), the presence or absence of a graphics processing unit (GPU), the presence or absence of a decoder, and the presence or absence of an encoder, and wherein the rendering capability information obtainer outputs to the transfer mode determiner, rendering capability information indicating the rendering capabilities of the transfer source and transfer destination.

2. The vehicle display device according to claim 1, wherein when the transfer source is able to transfer the image information directly to the transfer destination in the transfer mode as converted, the transfer mode determiner determines the transfer mode suitable for the rendering capability of the transfer destination, based on the image information, the rendering capability of the transfer source, and the rendering capability of the transfer destination.

3. The vehicle display device according to claim 1, further comprising:

a transfer path determiner that determines a transfer path from the transfer source to the transfer destination, wherein the vehicle includes a plurality of display devices including the display device, and when the transfer source is unable to transfer the image information directly to the transfer destination, the transfer mode determiner selects a repeater as a candidate repeater from among the plurality of display devices and determines whether the candidate repeater selected is able to transfer the image information to the transfer destination in the transfer mode suitable for the rendering capability of the transfer destination.

4. The vehicle display device according to claim 3,
wherein when determining that the candidate repeater selected is able to transfer the image information to the transfer destination in the transfer mode suitable for the rendering capability of the transfer destination, the transfer path determiner determines the candidate repeater as the repeater that is included in the transfer path and determines the transfer path from the transfer source to the transfer destination via the repeater determined.

5. The vehicle display device according to claim 4,
wherein the transfer mode determiner determines the transfer mode suitable for the rendering capability of the transfer destination, based on the image information, the rendering capability of the transfer source, and the rendering capability of the transfer destination, and
the repeater determined by the transfer path determiner converts the preset transfer mode to the transfer mode determined by the transfer mode determiner to be suitable for the rendering capability of the transfer destination, and transfers the image information to the transfer destination in the transfer mode as converted.

6. The vehicle display device according to claim 4,
wherein the repeater determined by the transfer path determiner
includes a display that displays first image information included in the image information obtained from the transfer source, and
converts the preset transfer mode to the transfer mode determined by the transfer mode determiner to be suitable for the rendering capability of the transfer destination, and
transfers second image information included in the image information to the transfer destination in the transfer mode as converted.

7. The vehicle display device according to claim 3,
wherein when the transfer path determiner determines that the candidate repeater selected is unable to transfer the image information to the transfer destination in the transfer mode suitable for the rendering capability of the transfer destination, the transfer source transfers the image information to the transfer destination without converting the transfer mode.

8. The vehicle display device according to claim 7, further comprising:
a performance estimator that estimates a frame rate of the transfer destination, based on performance information indicating performance of the transfer destination,
wherein when the frame rate of the transfer destination is higher than a predetermined threshold value, the transfer source transfers the image information to the transfer destination.

9. The vehicle display device according to claim 8,
wherein when the frame rate of the transfer destination is lower than or equal to the predetermined threshold value, the transfer source aborts transfer of the image information to the transfer destination and outputs a notification indicating that the transfer of the image information has been aborted.

10. The vehicle display device according to claim 7,
wherein when the transfer path determiner determines that the candidate repeater selected is unable to transfer the image information to the transfer destination in the transfer mode suitable for the rendering capability of the transfer destination, the transfer source outputs a notification indicating that the repeater is unusable.

11. The vehicle display device according to claim 7,
wherein when the transfer path determiner determines that the candidate repeater selected is unable to transfer the image information to the transfer destination in the transfer mode suitable for the rendering capability of the transfer destination, the transfer source outputs a list of new transfer destinations included among the plurality of display devices.

12. A vehicle display method of transferring image information from a transfer source to a transfer destination that is a display device included in a vehicle, the vehicle display method comprising:
determining a transfer mode of the image information suitable for a rendering capability of the transfer destination, based on the image information, a rendering capability of the transfer source, and the rendering capability of the transfer destination;
converting a preset transfer mode to the transfer mode determined in the determining, and transferring the image information to the transfer destination in the transfer mode as converted in the converting;
obtaining, based on hardware information of the transfer source and the transfer destination, the rendering capability of the transfer source and the rendering capability of the transfer destination, wherein the hardware information indicates the presence or absence of a central processing unit (CPU), the presence or absence of a graphics processing unit (GPU), the presence or absence of a decoder, and the presence or absence of an encoder; and
outputting rendering capability information indicating the rendering capabilities of the transfer source and transfer destination.

13. A non-transitory computer-readable recording medium having recorded thereon a computer program for causing a computer to execute the vehicle display method according to claim 12.

* * * * *